United States Patent [19]
Tabe

[11] Patent Number: 6,010,425
[45] Date of Patent: Jan. 4, 2000

[54] AUTOMATIC BICYCLE HUB TRANSMISSION USING FLYWEIGHTS

[75] Inventor: Koshi Tabe, Sakai, Japan

[73] Assignee: Shimano, Inc., Osaka, Japan

[21] Appl. No.: 09/128,359

[22] Filed: Aug. 3, 1998

[30]  Foreign Application Priority Data

| Aug. 8, 1997 | [JP] | Japan | ................................. | 9-215236 |
| Oct. 30, 1997 | [JP] | Japan | ................................. | 9-299178 |
| May 27, 1998 | [JP] | Japan | ................................. | 10-146128 |

[51] Int. Cl.[7] .............................. F16D 23/00; F16H 3/74
[52] U.S. Cl. ............................................. 475/259; 192/64
[58] Field of Search ....................... 192/64, 46; 475/259, 475/293, 296, 297

[56] References Cited

U.S. PATENT DOCUMENTS

| 3,600,974 | 8/1971 | Schwerdhofer et al. . | |
| 3,603,178 | 9/1971 | Lutz et al. . | |
| 3,659,688 | 5/1972 | Schulz | 192/46 |
| 4,580,670 | 4/1986 | Nagano | 192/64 |
| 4,858,494 | 8/1989 | Healy | 192/64 |

*Primary Examiner*—Rodney H. Bonck
*Assistant Examiner*—Tisha D. Waddell
*Attorney, Agent, or Firm*—James A. Deland

[57] ABSTRACT

A bicycle hub transmission includes a hub axle, a driver rotatably mounted to the hub axle, a slave rotatably mounted to the hub axle, a power transmitting mechanism disposed between the driver and the slave for changing a rotational speed of the driver and for communicating rotational power from the driver to the slave, a clutch mechanism for selectively engaging and disengaging the slave and the driver, and a clutch switching mechanism for controlling the operation of the clutch. The clutch switching mechanism includes an elongated weight member having a first end and a second end, wherein the second end pivots radially outwardly around the first end in response to centrifugal force created by rotation of the weight member around the hub axle. A control member is operatively coupled to the clutch mechanism and is rotatable about the hub axle between an engaging position for causing the clutch to engage the driver and the slave and a disengaging position for disengaging the driver and the slave. An interlocking member is coupled to the weight member in a position spaced apart from the first end of the weight member toward the second end of the weight member and coupled to the control member for rotating the control member in response to radially outward movement of the second end of the weight member. The weight member may be coupled for rotation with the driver or the slave as appropriate for the application. In either case the interlocking member may be formed as a link member having a first end connected to the control member and a second end connected to the weight member at the second end of the weight member to maximize movement of the control member in response to pivoting of the weight member.

42 Claims, 21 Drawing Sheets

FIG. 4A
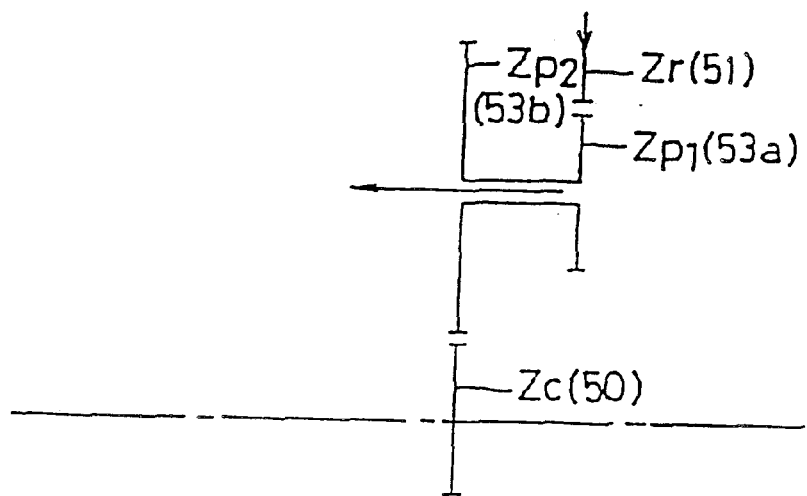
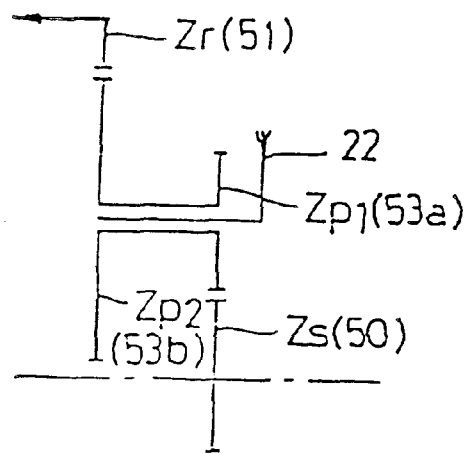
FIG. 4B

FIG. 21A
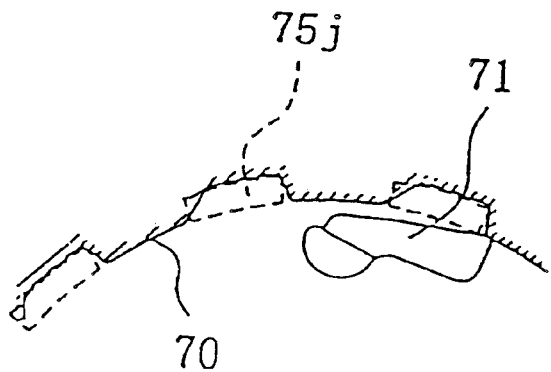
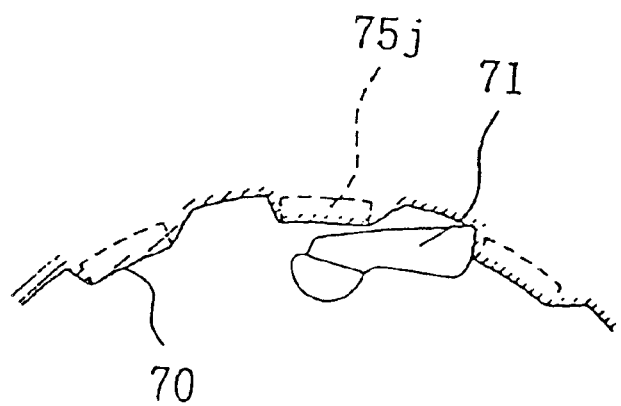
FIG. 21B ns using Flywe# AUTOMATIC BICYCLE HUB TRANSMISSION USING FLYWEIGHTS

BACKGROUND OF THE INVENTION

The present invention is directed to bicycle transmissions and, more particularly, to an automatic bicycle hub transmission which shifts gears in accordance with centrifugal force created by rotation of the hub.

U.S. Pat. No. 3,603,178 shows a bicycle equipped with an internal shifter hub wherein the gear ratio may be shifted automatically in accordance with centrifugal force created by the rotating wheel. Such an internal shifter hub comprises a hub axle, a driver capable of rotating about the hub axle, a hub shell, a planet gear mechanism for changing the speed of rotation of the driver and transmitting the result to the hub shell, a clutch mechanism for transmitting the output of the planet gear mechanism to the hub shell or stopping such transmission, a clutch-switching mechanism for switching the clutch mechanism by centrifugal force, and a support sleeve disposed between the planet gear mechanism and the hub shell.

The planet gear mechanism comprises an inner-tooth gear, a sun gear, a plurality of planet gears for meshing with the inner-tooth gear and the sun gear, and a planet gear carrier for supporting the plurality of planet gears. The planet gear carrier is formed integrally with the driver. The support sleeve is rotatably supported on the hub axle and is joined by a serrated joint with the planet gear carrier. A one-way clutch is mounted between the support sleeve and the hub shell.

The clutch mechanism has a ratchet pawl disposed between the inner-tooth gear and the hub shell, links the two when the ratchet pawl is in an engaged position, and disengages the two when the ratchet pawl is in a disengaged position. The hub shell is driven in an upshift mode via the planet gear mechanism when the clutch mechanism is in the engaged position, and the hub shell is driven while being directly linked to the driver when the ratchet pawl is in the disengaged position.

The clutch-switching mechanism comprises a weight member that swings by centrifugal force and a control member that rotates in response to swinging of the weight member. The weight member and control member are mounted on a weight support, itself mounted rotatably on the support sleeve. The weight support is nonrotatably linked to the inner-tooth gear.

The control member uses circular movement to switch the ratchet pawl of the clutch mechanism between the engaged position and the disengaged position. An upright control pin for interlocking with the control member is provided in the vicinity of the center about which the weight member is swung. The control member is provided with a slit for interlocking with the control pin and with a control hole for controlling the clutch pawl. The interlocking of the control pin and the slit converts the rocking movement of the weight member into the circular movement of the control member.

In such a conventional internal shifter hub, the ratchet pawl of the clutch mechanism is kept by the control hole of the control member in a position in which the pawl is separated from the hub shell until a rotational speed promoting the outward swinging of the weight member is reached. During this time, rotation transmitted from the sprocket to the driver is transmitted from the carrier to the hub shell via the support sleeve and the one-way clutch, and the hub shell is driven in a direct-coupled mode. When a certain rotational speed is achieved and the weight member has swung outward, the control pin turns while sliding in relation to the slit and causes the control member to rotate. When this happens, the ratchet pawl, controlled by the control hole, rises to the engaged position in which it is interlocked with the hub shell. In this state, the rotation that has been transmitted from the sprocket to the driver is upshifted and outputted from the carrier to the inner-tooth gear via the planet gears, and is further transmitted to the hub shell via the clutch mechanism, thus driving the hub shell in an upshifted mode.

In this arrangement wherein the clutch mechanism is switched and the speed is changed using centrifugal force, the extent of rocking of the weight member is very small because the weight member has a limited housing space. Additionally, the control pin has a short revolution path in relation to the rocking of the weight member because the control pin is disposed in the vicinity of the center of rocking of the weight support. The control member is therefore unable to rotate over significant distances, making it necessary that the ratchet pawl be switched between the engaged position and the disengaged position by a very small amount of circular movement.

Another drawback is that large centrifugal forces are difficult to obtain because of the limited housing space for the weight member. It is therefore necessary to increase the efficiency with which the rocking movement is converted to a circular movement in the clutch-switching mechanism. With the conventional arrangement described above, however, the efficiency with which the rocking movement is converted to a circular movement is low, the circular movement of the control member is impeded in relation to the rocking of the weight member, and smooth shifting is difficult to achieve because the control pin interlocked with the slit must slide along the slit to convert the rocking movement of the weight member into the rotational movement of the control member.

SUMMARY OF THE INVENTION

The present invention is directed to an internal shifting hub of the type which automatically switches gears in accordance with centrifugal force created by the rotating wheel. The rocking of the weight member is converted into rotation of the control member with greater efficiency and range of motion, thus resulting in smoother and more reliable shifting.

In one embodiment of the present invention, a bicycle hub transmission includes a hub axle, a driver rotatably mounted to the hub axle, a slave rotatably mounted to the hub axle, a power transmitting mechanism disposed between the driver and the slave for changing a rotational speed of the driver and for communicating rotational power from the driver to the slave, a clutch mechanism for selectively engaging and disengaging the slave and the driver, and a clutch switching mechanism for controlling the operation of the clutch. The clutch switching mechanism includes an elongated weight member having a first end and a second end, wherein the second end pivots radially outwardly around the first end in response to centrifugal force created by rotation of the weight member around the hub axle. A control member is operatively coupled to the clutch mechanism and is rotatable about the hub axle between an engaging position for causing the clutch to engage the driver and the slave and a disengaging position for disengaging the driver and the slave. An interlocking member is coupled to the weight member in a position spaced apart from the first end of the weight member toward the second end of the weight member and coupled to the control member for rotating the control member in response to radially outward movement of the second end of the weight member. The weight member may be coupled for rotation with the driver or the slave as appropriate for the application. In either case the interlocking member may be formed as a link member having a first end connected to the control member and a second end connected to the weight member at the second end of the weight member to maximize movement of the control member in response to pivoting of the weight member.

BRIEF DESCRIPTION OF THE DRAWINGS

FIG. 4(A) is a schematic diagram of the planet gear mechanism shown in FIG. 3;

FIG. 4 (B) is a schematic diagram of an alternative embodiment of a planet gear mechanism that may be used in an internal hub transmission according to the present invention;

FIG. 11 (B) is a view showing the clutch mechanism shown in FIG. 10 in an engaged state;

FIG. 21 (A) is a detailed view of the pawl shown in FIG. 20(A) in the disengaged state; and FIG. 21(B) is a detailed view of the pawl shown in FIG. 20(B) in the engaged state.

DETAILED DESCRIPTION OF THE EMBODIMENTS

Figure 1:
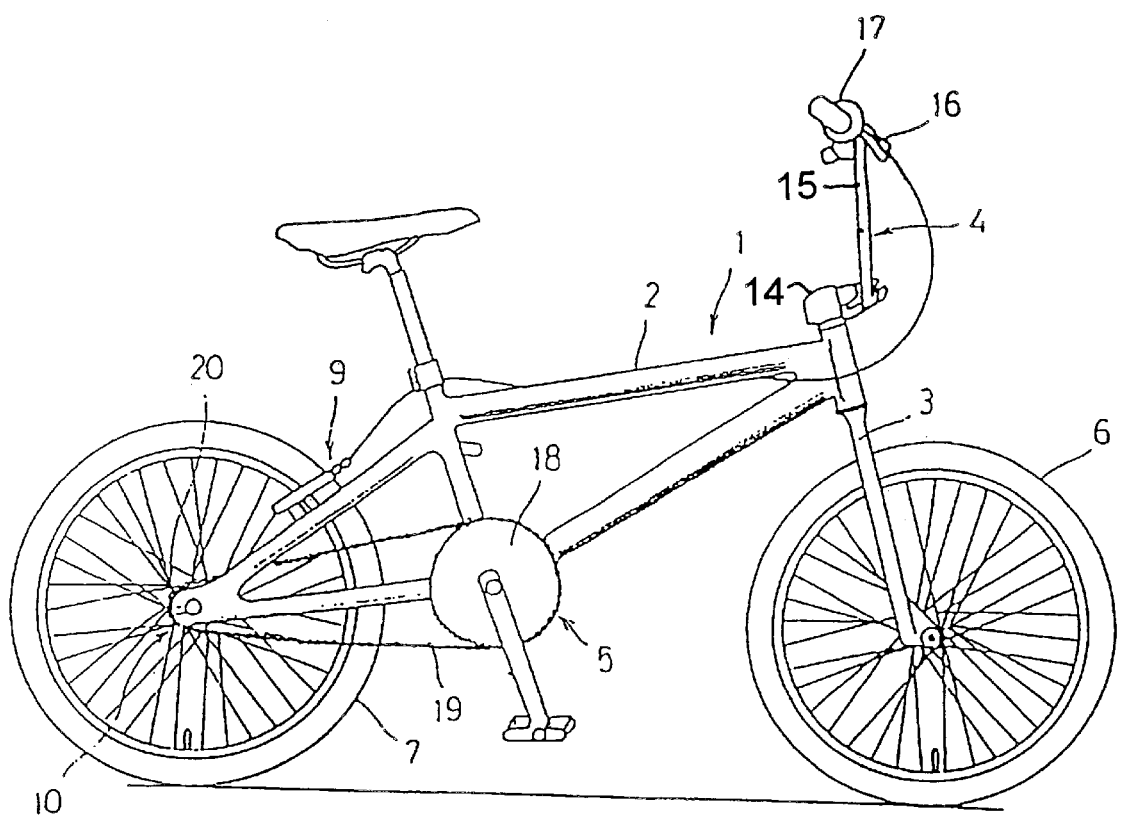
FIG. 1 is a side view of a bicycle that incorporates a particular embodiment of an internal hub transmission according to the present invention.

FIG. 1 is a side view of a bicycle that incorporates a particular embodiment of an internal hub transmission according to the present invention. In this embodiment, the bicycle is a BMX bicycle that comprises a frame 1 having a diamond-shaped frame body 2 and a front fork 3, a handle component 4, a driver unit 5, a front wheel 6, a rear wheel 7 provided with a two-speed internal shifter hub 10, and a cantilever-shaped sidepull rear brake device 9 for braking the rear wheel 7.

The handle component 4 has a handle stem 14 that is fixed to the top of the front fork 3 and a handlebar 15 that is fixed to the handle stem 14. A brake lever 16 and a grip 17, which control the rear brake device 9, are mounted on the right end of the handlebar 15. The driver unit 5 comprises a chainwheel 18 mounted in the lower portion (bottom bracket) of the frame body 2, a chain 19 wound around the chainwheel 18, and the internal shifter hub 10 equipped with a sprocket 20.

Figure 2:
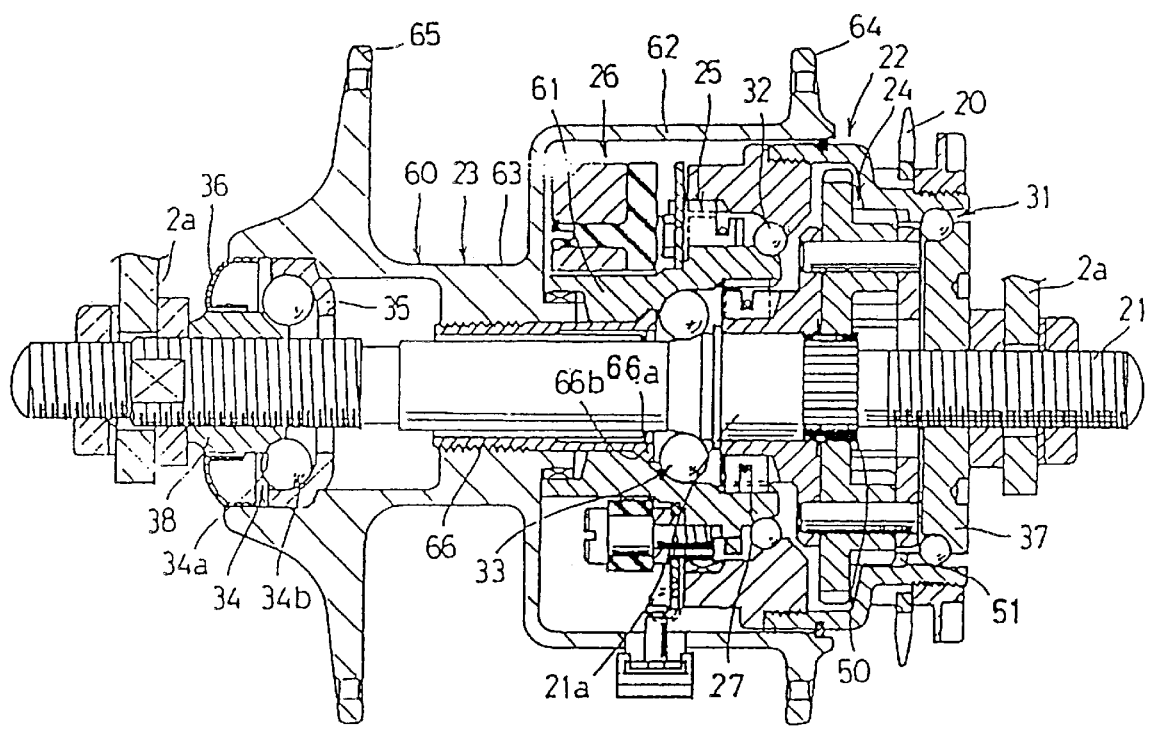
FIG. 2 is a cross sectional view of a particular embodiment of an internal shifter hub according to the present invention.
Figure 3:
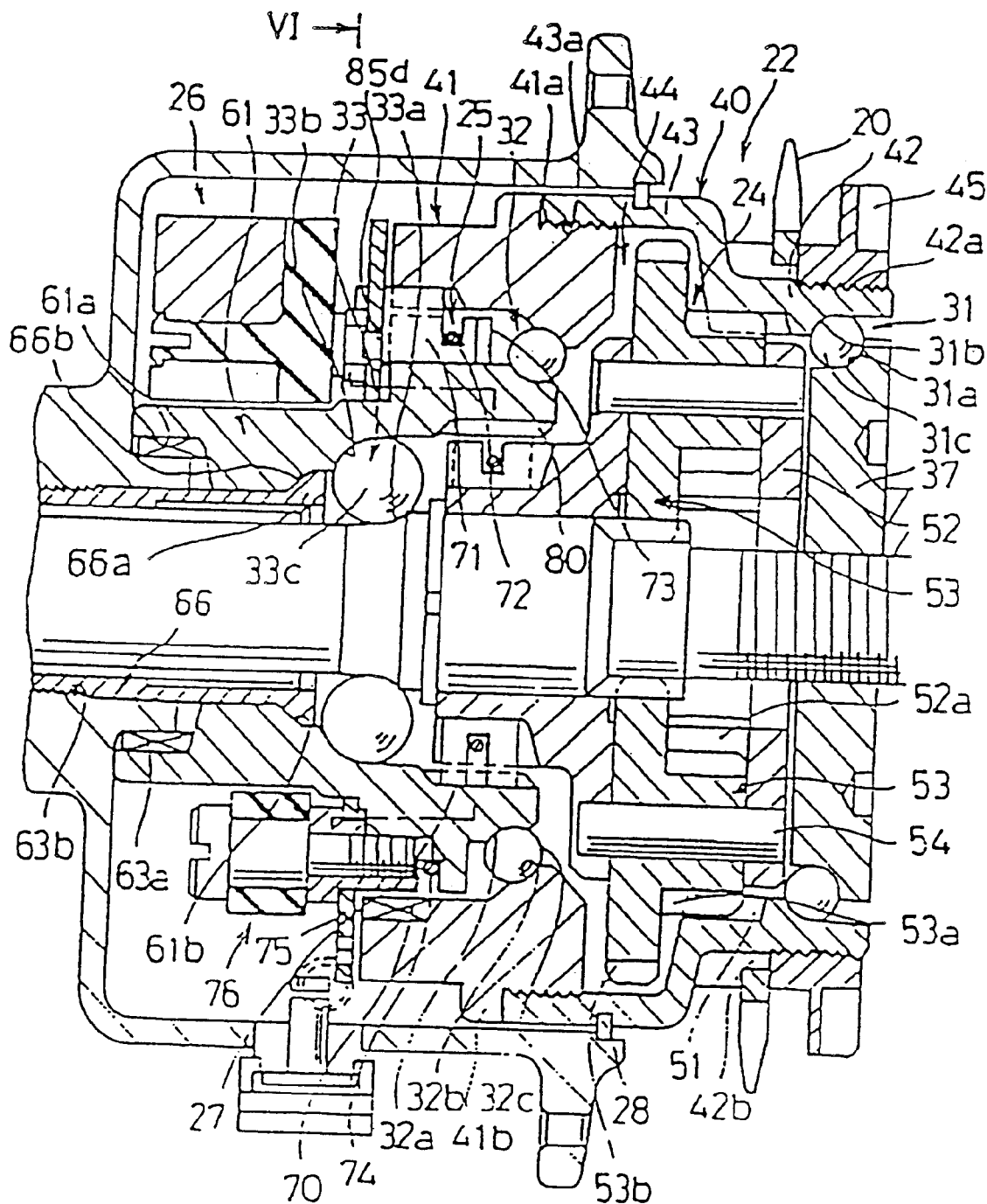
FIG. 3 is a detailed view of the right side portion of the hub shown in FIG. 2.

The internal shifter hub 10 is a two-step hub that includes downshifted and directcoupled power transmission paths. As shown in FIGS. 2 and 3, internal shifter hub 10 comprises a hub axle 21 fixed in the rear fork ends 2a, a driver 22 rotatably mounted around the outside on one end of the hub axle 21, a slave 23 that is disposed farther outward around the outside of the hub axle 21 and the driver 22 and that is linked to the rear wheel 7, a planet gear mechanism 24 disposed around the inside of the driver 22, a clutch mechanism 25 for engaging and disengaging the driver 22 and the slave 23, a clutch-switching mechanism 26 for switching the clutch mechanism 25, and a one-way clutch mechanism 27 for transmitting rotation in the traveling direction alone from the planet gear mechanism 24 to the slave 23. The right end of the driver 22 is rotatably supported by a bearing component 31 on the hub axle 21, and the left end is rotatably supported by a bearing component 32 in the slave 23. The two ends of the slave 23 are rotatably supported by bearing components 33 and 34 on the hub axle 21.

As noted above, the hub axle 21 is fixed to the rear fork ends 2a of the bicycle frame body 2. Threaded portions for fixing or otherwise securing the axle in the rear fork ends 2a are formed on both ends of the hub axle 21. A large-diameter portion 21a is formed on the hub axle 21 somewhat to the right of the central section, and the sun gear 50 of the planet gear mechanism 24 is formed on the right side of the large-diameter portion 21a. Hub cone members 37 and 38 having arm-shaped hub cone surfaces 31a and 34a for the bearing components 31 and 34, respectively, are screwed onto the mounting portions of the hub axle 21 that lie inward in relation to the rear fork ends 2a.

Driver 22 is a member for transmitting the rotation of the sprocket 20. As shown more specifically in FIG. 3, the driver 22 comprises a first cylindrical component 40 and a second cylindrical component 41 that is nonrotatably linked to the first cylindrical component 40. The right end of the first cylindrical component 40 is rotatably supported by the bearing component 31, and the left end of the second cylindrical component 41 is rotatably supported by the bearing component 32.

The first cylindrical component 40 comprises a small-diameter portion 42 on the right side of FIG. 3, and a large-diameter portion 43 that is flared on the left side of the small-diameter portion 42. A housing space 44 for accommodating the planet gear mechanism 24 is formed inside the first cylindrical component 40. The outer peripheral surface at the end of the small-diameter portion 42 is provided with an external thread 42a, and a lock nut 45 for fixing the sprocket 20 is screwed thereon. A sprocket attachment section 42b composed of outer serrations is formed on the outer peripheral surface of the small-diameter portion 42 in proximity to the external thread 42a, with the sprocket 20 nonrotatably attached. The inner-tooth gear 51 of the planet gear mechanism 24 is formed on the inner peripheral surface of the small-diameter portion 42 on the side that faces the large-diameter portion 43. An armshaped ball race surface 31b for the bearing component 31 is formed on the inner peripheral surface at the end of the small-diameter portion 42. The bearing component 31 comprises the ball race surface 31b, the hub cone surface 31a, and a plurality of balls 31c interposed between the ball race surface 31b and the hub cone surface 31a.

An internal thread 43a, which is formed on the inner peripheral surface at the end of the large-diameter portion 43, is screwed onto an external thread 41a formed on the end face of the second cylindrical component 41, thus nonrotatably linking the first cylindrical component 40 and the second cylindrical component 41. A stop 41b that rests against the tip of the large-diameter portion 43 of the first cylindrical component 40 in proximity to the external thread 41a is formed in the outer peripheral surface of the second cylindrical component 41. The outside diameter of the stop 41b is essentially the same size as the outside diameter of the large-diameter portion 43 of the first cylindrical component 40. The bearing component 32 and the clutch mechanism 25 are disposed around the inside of the second cylindrical component 41. For this reason, the ball race surface 32b of the bearing component 32 and the ratchet teeth 70 of the clutch mechanism 25 are formed on the inner peripheral surface of the second cylindrical component 41. The bearing component 32 comprises the ball race surface 32b, a hub cone surface 32a formed on the outer peripheral surface at the end of a power transmitting body 61 of the slave 23, and a plurality of balls 32c interposed between the ball race surface 32b and the hub cone surface 32a. A seal ring 28 for sealing the gap formed by the slave 23 is fitted over the outer peripheral surface of the large-diameter portion 43 of the first cylindrical component 40.

Forming the driver 22 into a first cylindrical component 40 and a second cylindrical component 41 makes it possible to mount the planet gear mechanism 24 on the hub axle 21 without increasing the outside diameter of the second cylindrical component 41 even when a bearing component 32 is provided. The outside diameter of the entire hub can therefore be reduced.

As shown in FIG. 2, the slave 23 is a cylindrical member driven by the driver 22 for rotating the rear wheel 7. The slave 23 comprises a hub shell 60 that is partially disposed around the outside of the driver 22 and a power transmitting body 61 that is fastened to the hub shell 60 by a fixing bolt 66 and that is disposed around the inside of the driver 22. This power transmitting body 61, in addition to functioning as a body for transmitting power from the driver 22 or the planet gear mechanism 24 to the hub shell 60, also functions as a weight support for the clutch-switching mechanism 26 described below.

The hub shell 60, which may be a cylindrical member made of aluminum, has a large-diameter mechanism housing 62 for accommodating the driver 22, the clutch-switching mechanism 26, and the like, and a small-diameter, narrow cylindrical component 63 formed integrally with the mechanism housing 62. Hub flanges 64 and 65 for securing the spokes (not shown) of the rear wheel 7 are integrally formed on the outer peripheral surfaces of the mechanism housing 62 and narrow cylindrical component 63. As shown in FIG. 3, the right end of the narrow cylindrical component 63 is provided with outer serrations 63a for nonrotatably securing the power transmitting body 61, and the inner peripheral surface is provided with an internal thread 63b for the threaded engagement of the fixing bolt 66. A space for accommodating the bearing component 34 is formed in the left end of the narrow cylindrical component 63, and a ball race member 35 provided with a ball race surface 34b is secured in this space. The bearing component 34 comprises the hub cone surface 34a, the ball race surface 34b, and a plurality of balls 34c interposed between the ball race surface 34b and the hub cone surface 34a. A dust cap 36 is fitted over the bearing component 34.

The power transmitting body 61 may be a stepped cylindrical member made of chromium-molybdenum steel. As shown in FIG. 3, inner serrations 61a for meshing with the outer serrations 63a of the narrow cylindrical component 63 are formed on the inner peripheral surface of the left end. The hub cone surface 32a for the bearing component 32 is formed on the outer peripheral surface at the right end of the power transmitting body 61, and ratchet teeth 80 constituting part of the one-way clutch mechanism 27 are formed on the inner peripheral surface of the right end. In addition, a ball race surface 33b for the bearing component 33 is formed on the inner peripheral surface in proximity to the ratchet teeth 80. The bearing component 33 comprises the ball race surface 33b, a hub cone surface 33a formed in the shape of an arm on the left end of the large-diameter portion 21a of the hub axle 21, and a plurality of balls 33c interposed between the hub cone surface 33a and the ball race surface 33b.

A tapered section 61b is formed on the inner peripheral surface of the power transmitting body 61 in proximity to the section constituting the ball race surface 33b. The fixing bolt 66 is a hollow cylindrical bolt, and the hub shell 60 and the power transmitting body 61 are firmly fastened in a concentric fashion. The head 66a of the fixing bolt 66 is provided with a tapered surface 66b for interlocking with the tapered section 61b, thus allowing the power transmitting body 61 and the hub shell 60 to be aligned and fastened.

The planet gear mechanism 24 comprises the sun gear 50 formed on the hub axle 21, the inner-tooth gear 51 formed on the small-diameter portion 42 of the first cylindrical component 40 of the driver 22, a carrier 52 rotatably mounted on the large-diameter portion 21a of the hub axle 21, and three planet gears 53 rotatably supported on the carrier 52. The carrier 52 is a member shaped as a collar flange with the hub axle 21 passing through it, and three gear housings 52a spaced at regular intervals in the peripheral direction are formed on the outer peripheral surface of this member. Three gear axles 54 for rotatably supporting the planet gears 53 are fixed to the carrier 52. The planet gears 53 have a small-diameter first gear element 53a for meshing with the inner-tooth gear 51 and a large-diameter second gear element 53b for meshing with the sun gear 50. The first gear element 53a and the second gear element 53b are formed adjacent to each other in the axial direction. The two gear elements 53a and 53b make it possible to obtain a gear ratio corresponding to a cross ratio with a smaller number of teeth on the inner-tooth gear than in the case of a single gear element.

As shown in FIG. 4a, the gear ratio $G_R$ can be expressed by the following equation for a downshift in the inner-tooth gear input and carrier output:

$$G_R=1/(1+(Z_s/Z_r)\times(Z_{p2}/Z_{p1})),$$

where $Z_s$ is the number of teeth on the sun gear 50, $Z_r$ is the number of teeth on the inner-tooth gear 51, $Z_{p1}$ is the number of teeth on the first gear element 53a of a planet gear 53, and $Z_{p2}$ is the number of teeth on the second gear element 53b.

Here, the following result may be obtained if the number of teeth $Z_s$ on the sun gear is set to 15, the number of teeth $Z_r$ on the inner-tooth gear to 57, the number of teeth $Z_{p1}$ on the first gear element to 28, and the number of teeth $Z_{p2}$ on the second gear element to 13:

$$G_R=1/(1+(15/57)\times(13/28))=0.891$$

Consequently, the gear ratio $G_R$ is 0.891, and a single turn of the driver 22 is transmitted to the slave 23 after being reduced in speed to 0.891 revolutions.

The gear ratio of the planet gear mechanism 24 should fall within a range of 0.8–0.95. In this case, a fast start can be accomplished, and the outside diameter of the internal shifter hub 10 reduced even when downshifting is performed at a cross ratio.

The gear ratio $G_R$ can be expressed by the following equation when downshifting is performed with the aid of planet gears consisting of a single gear element.

$$G_R=1(1+(Z_s/Z_r))$$

In this case, the gear ratio $G_R$ is determined solely by the number of teeth $Z_r$ on the inner-tooth gear and the number of teeth $Z_s$ on the outer-tooth gear. Let us solve the equation $0.891=1/(1+(15/Z_r))$ in an attempt to obtain a gear ratio of 0.891 with the aforementioned cross ratio by assuming that the number of teeth $Z_s$ on the sun gear is 15. As a result, the number of teeth $Z_r$ on the inner-tooth gear is 123, and the outside diameter of the driver 22 is increased at least twofold in comparison with a case in which the gear has two gear elements.

Figure 5:
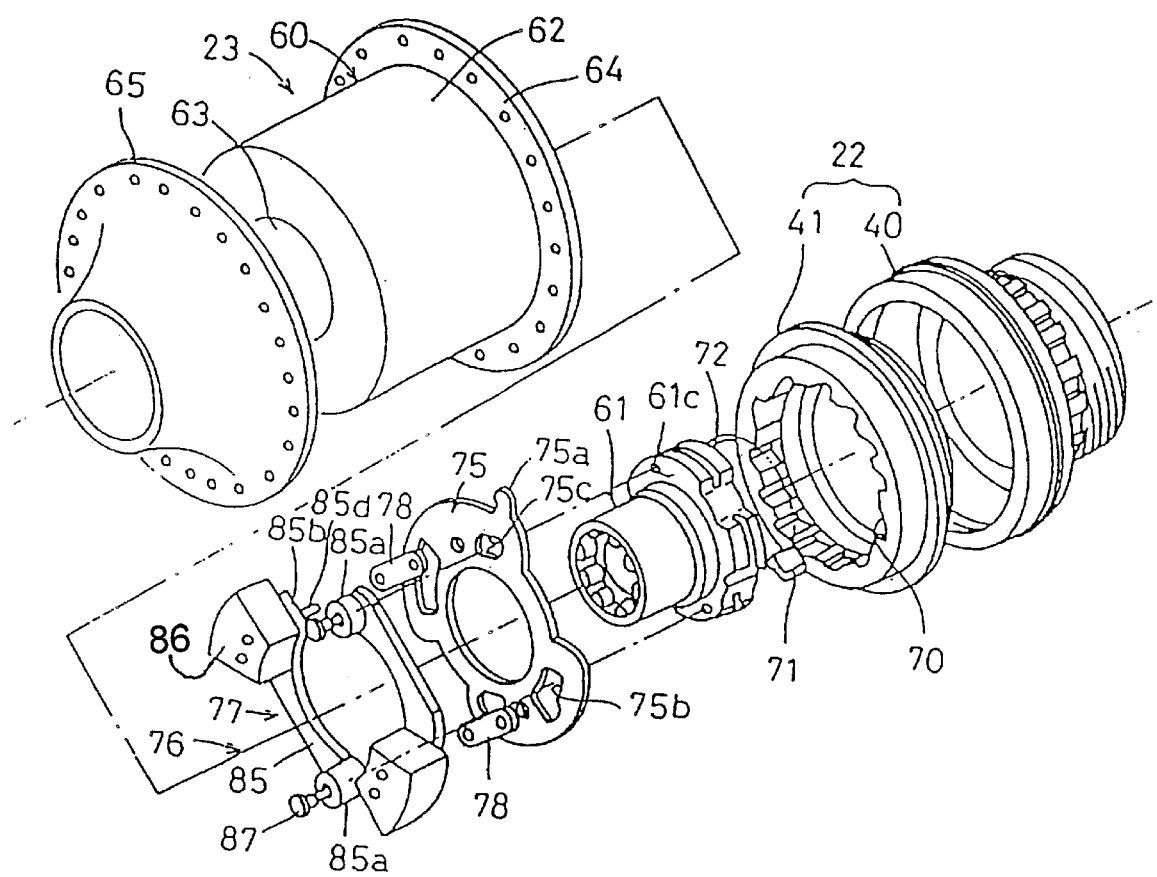
FIG. 5 is an exploded view of the clutch mechanism shown in FIG. 3.
Figure 6:
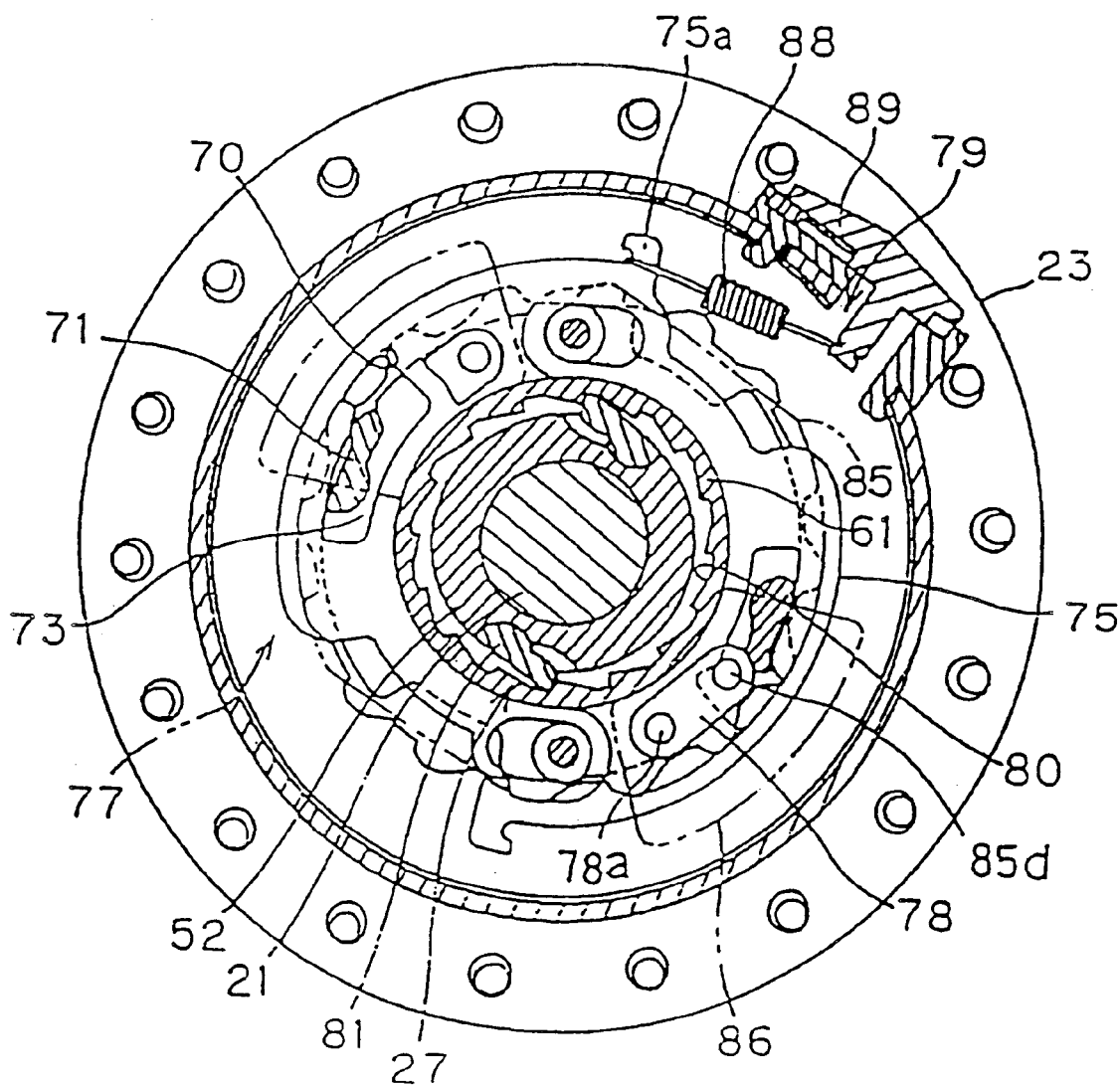
FIG. 6 is a view taken along line VI—VI in FIG. 3 showing the clutch mechanism in a disengaged state.

As shown in FIGS. 3, 5, and 6, the clutch mechanism 25 has ratchet teeth 70 formed as sawteeth on the inner peripheral surface of the second cylindrical component 41 of the driver 22, two clutch pawls 71 capable of meshing with the ratchet teeth 70, and a spring member 72 for biasing the clutch pawls 71. The clutch pawls 71 are mounted on the outer peripheral surface of the power transmitting body 61 while allowed to alternate between an engaged state in which they mesh with the ratchet teeth 70 and a disengaged state in which they are separated from the ratchet teeth 70. Pawl housings 73 for accommodating the clutch pawls 71 are provided at two positions on the outer peripheral surface of the power transmitting body 61. The spring member 72, which is positioned in a wound state in a groove 74 formed in the outer peripheral surface of the power transmitting body 61, biases the clutch pawls 71 into an engaged state. It is only when the clutch pawls 71 are in the engaged state and the driver 22 rotates in the traveling direction that the rotation of the clutch mechanism 25 is transmitted to the power transmitting body 61 of the slave 23.

Figure 7:
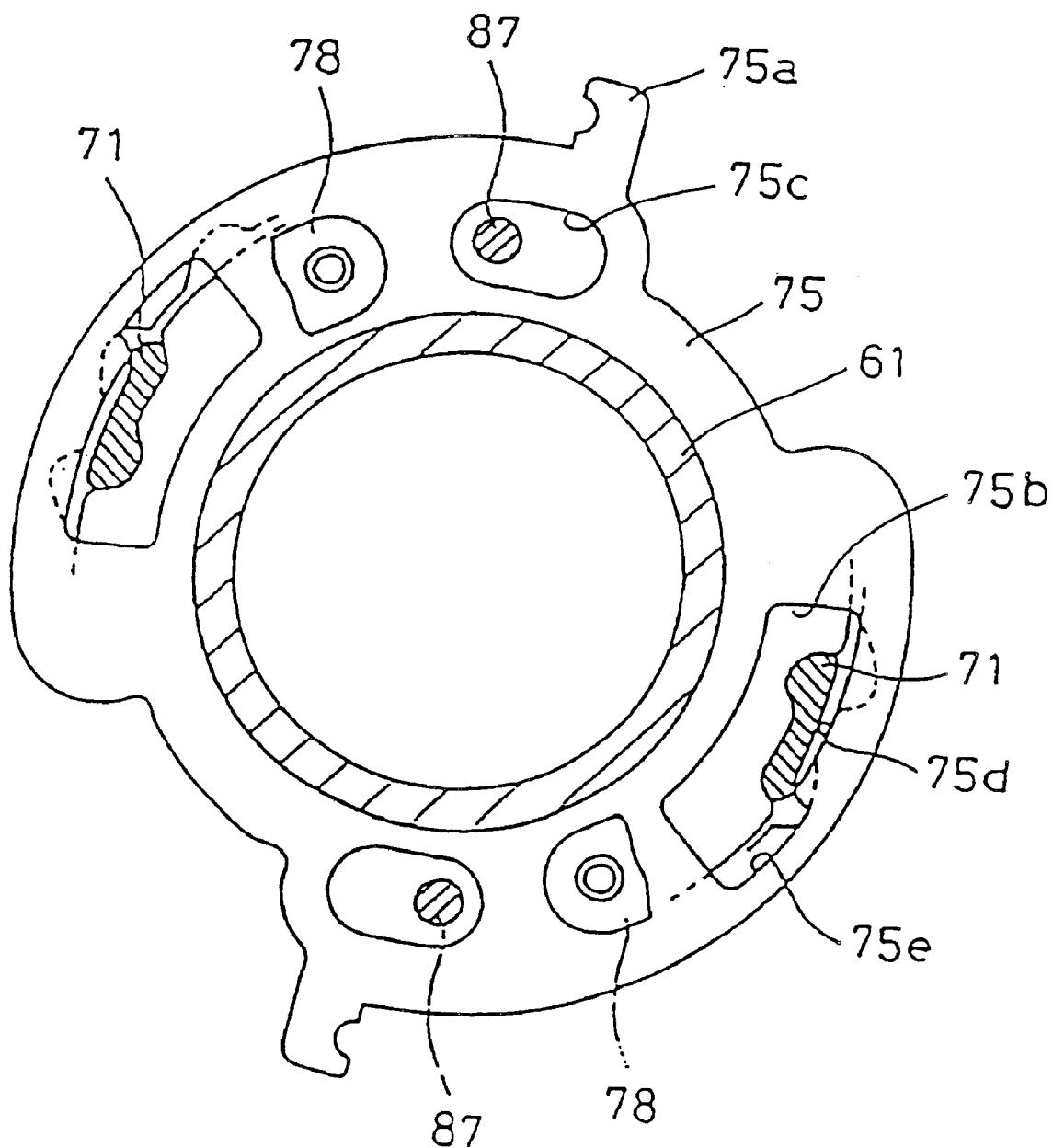
FIG. 7 is a front view of a control plate used in the clutch mechanism in a disengaged state.

The clutch-switching mechanism 26 comprises a control plate 75 for switching the clutch pawls 71 between the engaged state and the disengaged state, a moving mechanism 76 for moving the control plate 75 in a reciprocating fashion about the hub axle, and a weight support doubling as the power transmitting body 61. As shown in FIG. 7, the control plate 75 is a flat member shaped as a modified ring and rotatably supported in its central portion by the power transmitting body 61. A hook 75a extending radially outward is formed on the outer edge of the control plate 75, and two control windows 75b for controlling the clutch pawls 71 are formed between the inner and outer circumferences. The clutch pawls 71 are disposed such that they extend from the control windows 75b in the direction of the moving mechanism 76. The control windows 75b are provided with disengaging frames 75d for holding the clutch pawls 71 in a disengaged state, and with engaging frames 75e for switching the pawls to an engaged state. The clutch pawls 71 biased by the spring member 72 can be raised into the engaged state by shaping the linking frames 75e such that they extend radially outward from the disengaging frames 75d. The hook 75a, the control windows 75b, and all the other components are set apart 180 degrees from each other (depending on the number of elements) to achieve balanced rotation. In addition, two through holes 75c accommodating the rocking axles 87 of weight retainers 85 (discussed below) are formed between the inner and outer circumferences. The control plate 75 is normally held in a disengaged position (shown in FIGS. 6 and 7) by the spring mechanism 79 described below. At this time, the tips of the clutch pawls 71 are stopped by the disengaging frames 75d of the control windows 75b, and the pawls are held in a disengaged state.

As shown in FIG. 5, the moving mechanism 76, which is disposed on the left side of the control plate 75, comprises two rocking weight members 77, links 78 for linking the two respective weight members 77 and the control plate 75, and a spring mechanism 79 (FIG. 6) for energizing the control plate 75 clockwise in FIG. 6. The weight members 77 comprise two weight retainers 85 swingably mounted on the end face 61c of the power transmitting body 61 and weights 86 mounted on the tips of the weight retainers 85. The two weight retainers 85 may be made of a polyacetal resin. The weight retainers 85 are formed such that they form a curve around the power transmitting body 61, and they are positioned in the same way 180 degrees apart from each other around the power transmitting body 61. Bosses 85a are formed integrally with the bases of the weight retainers 85, and weight mounting components 85b composed of two protruding pins are formed integrally with the tips of the weight retainers 85. The rocking axles 87 pass through the bosses 85a. The rocking axles 87 also pass via the through holes 75c, and the tips of these axles are fixed to the power transmitting body 61. In addition, link pins 85d are formed integrally with the tips of the weight retainers 85 on the sides opposite from the weight mounting components 85b. The link pins 85d are used for the rotatable mounting of the links 78. The weights 86, which may be fan-shaped members made of lead or steel, are fixed by the two pins of weight mounting components 85c.

The links 78 are members for rotating the control plate 75 in response to the movement of the tips of the weight members 77 which are swung by the bases. The control plate 75 and the tips of the weight retainers 85 are linked to the two ends of these links. The links 78 are flat members made of metal. One end of each link is provided with a round hole for inserting the link pins 85d, and the other-end is provided with a round hole for inserting a link pin 78a, which is used to achieve linkage with the control plate 75.

As shown in FIG. 6, the spring mechanism 79 has a coil spring 88, one end of which is secured to the hook 75a, and a spring force adjustment mechanism 89 for adjusting the spring force of the coil spring 88. Shift timing can be adjusted by adjusting the spring force of the coil spring 88. The shift timing can also be varied by replacing the weights 86.

The one-way clutch 27, which may be a pawl type, comprises ratchet teeth 80 formed on the inner peripheral surface of the power transmitting body 61, clutch pawls 81 mounted on the outer peripheral surface of the carrier 52 of the planet gear mechanism 24 while allowed to alternate between an engaged state and a disengaged state, and a spring member (not shown) for biasing the clutch pawls 81 into the engaged state. In the one-way clutch 27, the clutch pawls 81 are normally raised into the engaged state, and the rotation of the carrier 52 is transmitted to the power transmitting body 61 when this carrier rotates in the traveling direction. No rotation is transmitted when the power transmitting body 61 rotates in the traveling direction at a higher speed than does the carrier 52.

The internal shifter hub 10 has the following paths because of the presence of such a planet gear mechanism 24, clutch mechanism 25, clutch-switching mechanism 26, and one-way clutch 27:

a downshifted power transmission path composed of the driver 22, inner-tooth gear 51, planet gear mechanism 24, carrier 52, and slave 23; and a direct-coupled power transmission path composed of the driver 22, clutch mechanism 25, and slave 23.

When the rider steps on the pedals during startup and propels the bicycle, the resulting rotation is transmitted to the driver 22 via the sprocket 20. At this time, the control plate 75 is in a disengaged position, and the clutch pawls 71 are held in a disengaged state by the control plate 75. Consequently, there is no linkage between the driver 22 and the power transmitting body 61, and the rotation of the driver 22 is transmitted to the power transmitting body 61 along the downshifted power transmission path. As a result, the rotation of the sprocket 20 during startup is transmitted to the hub shell 60 after being reduced in speed to 0.891, for example. It is therefore possible to lightly step on the pedals during startup while still achieving a fast start.

Figure 8:
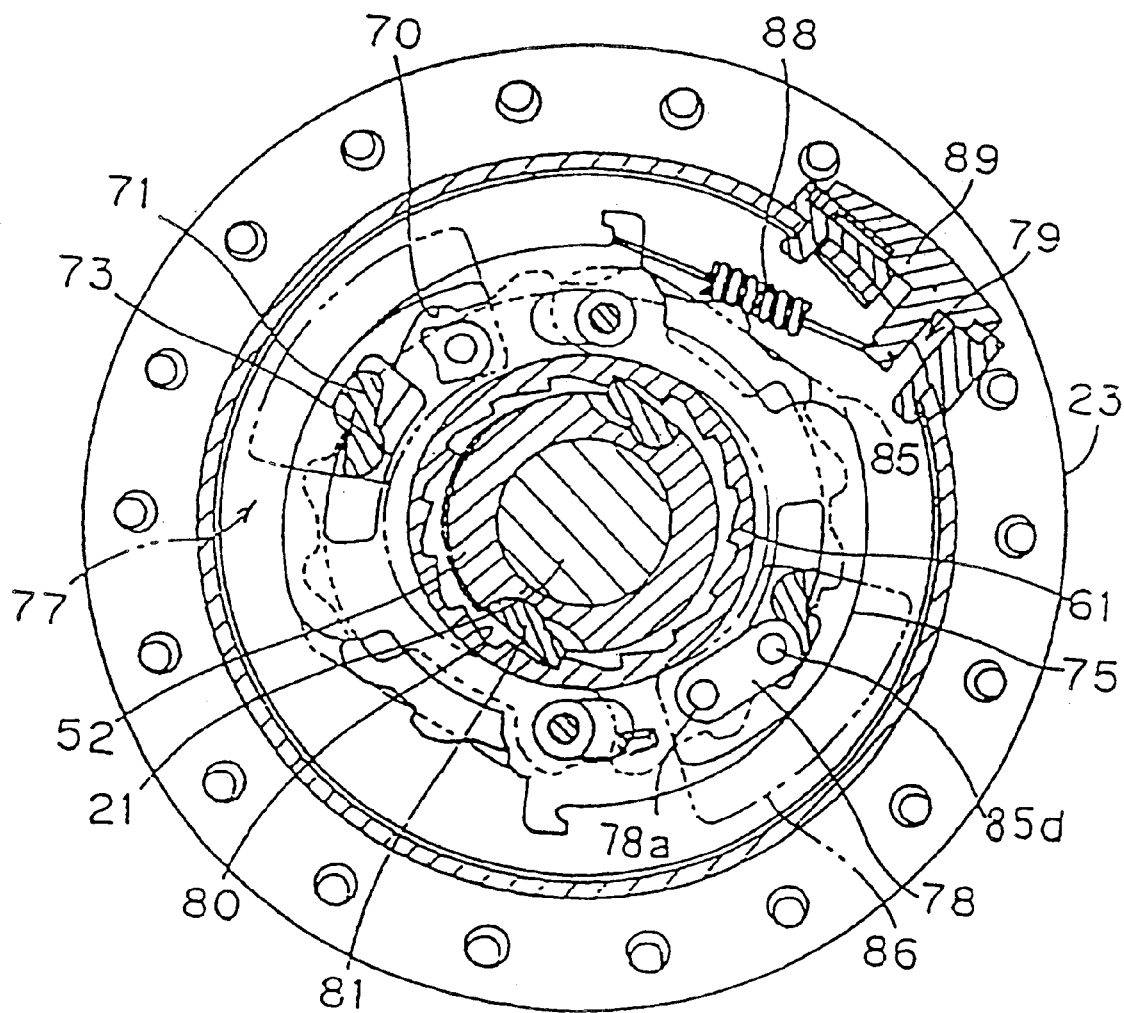
FIG. 8 is a view taken along line VI—VI in FIG. 3 showing the clutch mechanism in an engaged state.
Figure 9:
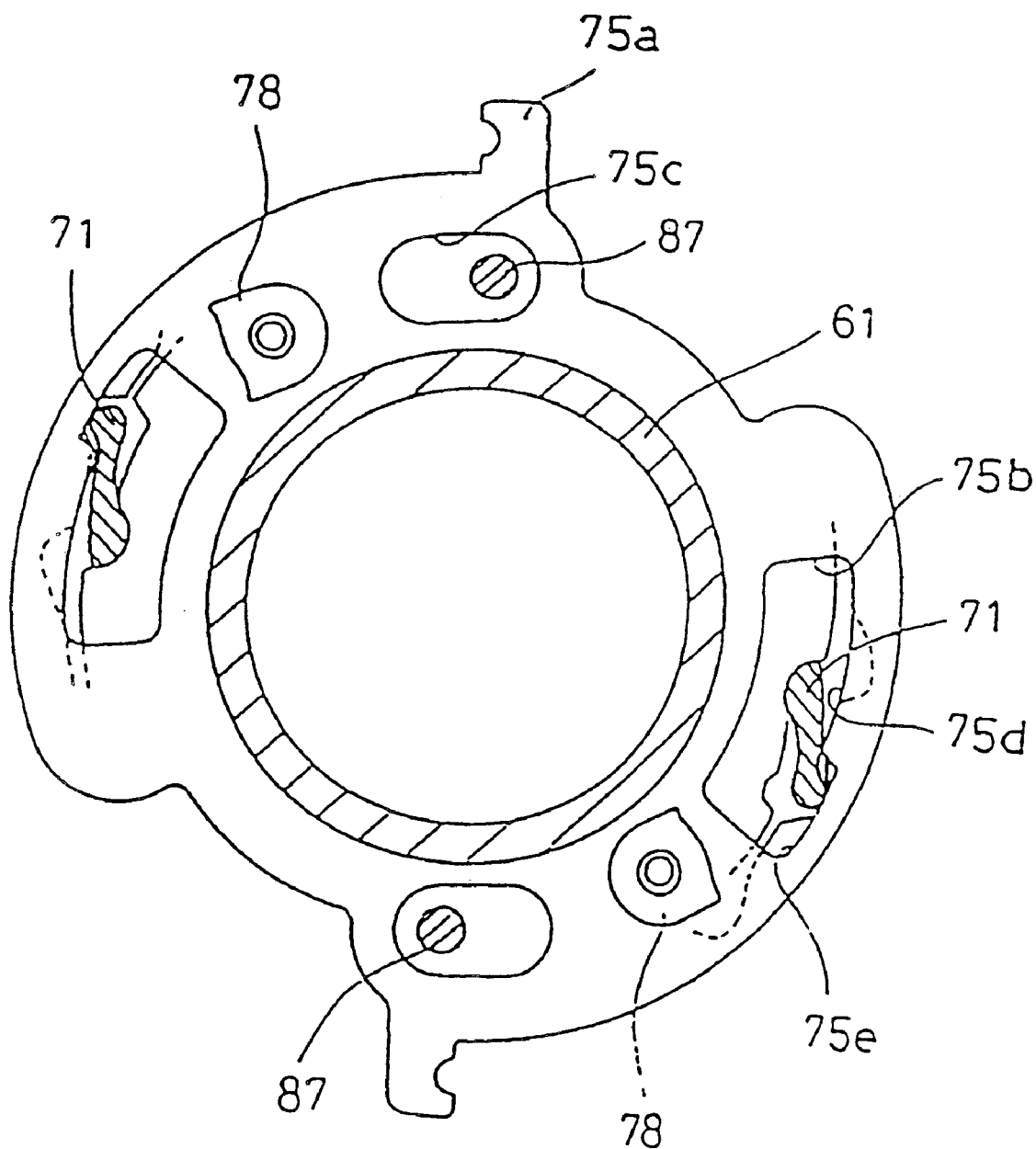
FIG. 9 is a front view of the control plate used in the clutch mechanism in an engaged state.

As shown in FIGS. 8 and 9, the weight members 77 swing outward against the action of the biasing force exerted by the coil spring 88 of the control plate 75 when the power transmitting body 61 achieves a rotational speed above a certain level. This level is determined by the adjustment of the spring mechanism 79, the mass of the weights, or the like. When the weight members 77 move in this manner, the control plate 75 is rotated counterclockwise in FIG. 8 through the intermediary of the links 78 until it reaches an engaged position. When the control plate 75 has reached the engaged position, the linking frames 75e of the control windows 75b position themselves at the tips of the clutch pawls 71, and the clutch pawls 71 are raised into the engaged state by the biasing force of the spring member 72. As a result, the rotation of the driver 22 in the traveling direction is transmitted directly to the power transmitting body 61 along the direct-coupled power transmission path, and the rotation of the sprocket 20 is transmitted unchanged to the rear wheel 7. Consequently, an upshift is performed once the rotational speed has exceeded a certain level. There is no reduction in the transmission efficiency of the planet gear mechanism 24 during this regular ride because the driver 22 and the slave 23 are coupled directly.

When the rotational speed of the power transmitting body 61 drops below a prescribed level during cornering or the like, the weight members 77 are returned to their initial disengaged state by the coil spring 88, and the rotation of the driver 22 is transmitted to the slave 23 along the downshifted power transmission path. Because in this case the weight members 77 are mounted on the power transmitting body 61 constituting part of the slave 23, the gears are always changed toward higher speeds (toward the direct-coupled position) once the rear wheel 7 exceeds a certain rotational speed. This occurs even then the driver 22 does not rotate, that is, when the rider is not pedaling. Shifting that reacts to the bicycle speed can therefore be achieved on a constant basis. Consequently, swift shifting and quick acceleration can be achieved during startup, cornering, and in other cases requiring a transition from a lower speed to a higher speed when the goal is to maintain high speeds for extended periods of time, as in a bicycle race.

Figure 10:
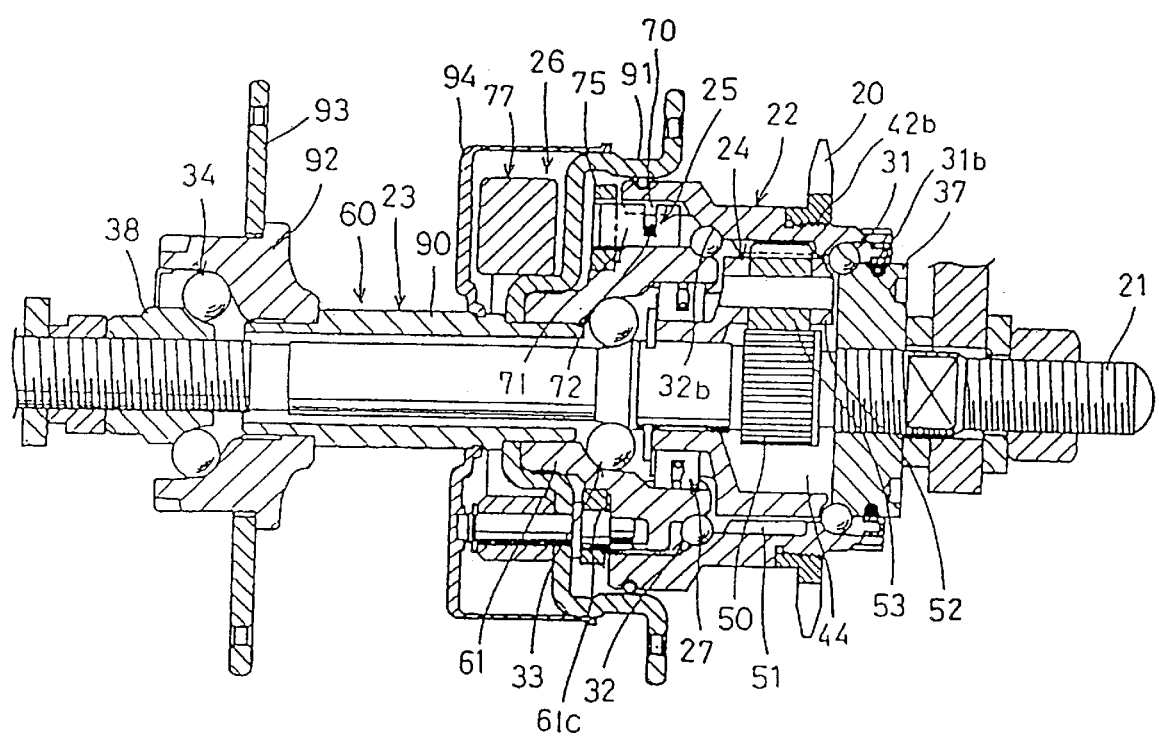
FIG. 10 is a cross sectional view of another embodiment of an internal shifter hub according to the present invention.

FIG. 10 is a cross sectional view of another embodiment of an internal shifter hub according to the present invention. The embodiment shown in FIGS. 2–9 referred to an example in which a planet gear mechanism having planet gears that consisted of two gear elements was used to achieve a gear ratio corresponding to a cross ratio. However, it is also possible to use planet gears having a single gear element when the cross ratio is not needed, as in the case of a street bike, for example, as shown in FIG. 10. In the description that follows, the same symbols are used to denote identical or similar members, and only the significant differences between the structures are described.

The internal shifter hub 10 in FIG. 10 comprises a hub axle 21, a driver 22, a slave 23, a planet gear mechanism 24, a clutch mechanism 25, a clutch-switching mechanism 26, and a one-way clutch 27. The driver 22 has a one-piece structure that is different from that described with reference to the first embodiment. A housing space 44 for accommodating the planet gear mechanism 24 is formed inside the driver 22, and a sprocket attachment section 42b consisting of an external thread is formed on the outer peripheral surface at the end of the driver 22. The inner-tooth gear 51 of the planet gear mechanism 24 is formed on the inner peripheral surface of the driver 22. In addition, arm-shaped ball race surfaces 31b and 32b for the bearing components 31 and 32, respectively, are formed such that the inner-tooth gear 51 is sandwiched between them. In all other respects, the structure of the bearing components 31 and 33 is the same as in the first embodiment described above. Ratchet teeth 70 that are shaped as sawteeth and that constitute the clutch mechanism 25 are formed on the inner peripheral surface of the left end of the driver 22 in the peripheral direction (for example, at four equidistant positions).

The slave 23 has a hub shell 60 and a power transmitting body 61 that is riveted to the hub shell 60. The hub shell 60 has a cylindrical component 90, a right hub flange 91 riveted to the right end of the cylindrical component 90, a flange boss 92 riveted to the left end of the cylindrical component 90, and a left hub flange 93 riveted to the outer peripheral surface of the flange boss 92. All these components may be made from a rolled steel designed for common structural applications. In addition, a synthetic resin cover 94 for accommodating the weight members 77 of the clutch-switching mechanism 26 is provided closer to the center away from the right-hand flange fixing component of the cylindrical component 90. The right-hand hub flange 91 is press-molded into a stepped bowl that accommodates the control plate 75 for the clutch mechanism 25 and the clutch-switching mechanism 26.

Except for the structure of the planet gears 53, the planet gear mechanism 24 is identical to the one described with reference to the above embodiment. The planet gears 53 are formed as a single gear element. If it is assumed in this case that the number of teeth $Z_s$ on the sun gear 50 is 18, the number of teeth $Z_r$ on the inner-tooth gear 51 is 48, and the number of tips $Z_p$ of the planet gears 53 is 14, then the gear ratio GR will be $$GR = 1/(1+(Zs/Zr)) = 1/(1+(18/48)) = 0.727,$$

irrespective of the number of teeth on the planet gears 53.

The clutch mechanism 25 comprises ratchet teeth 70, clutch pawls 71 that mesh with the ratchet teeth 70, and a spring member 72 for energizing the clutch pawls 71. The clutch pawls 71 are mounted on the outer peripheral surface of the power transmitting body 61 while allowed to alternate between an engaged state in which they mesh with the ratchet teeth 70, and a disengaged state in which they are separated from the ratchet teeth 70. As in the embodiment described above, the clutch pawls 71 are controlled by the control plate 75 of the clutch-switching mechanism 26.

Figures 11A, 11B:
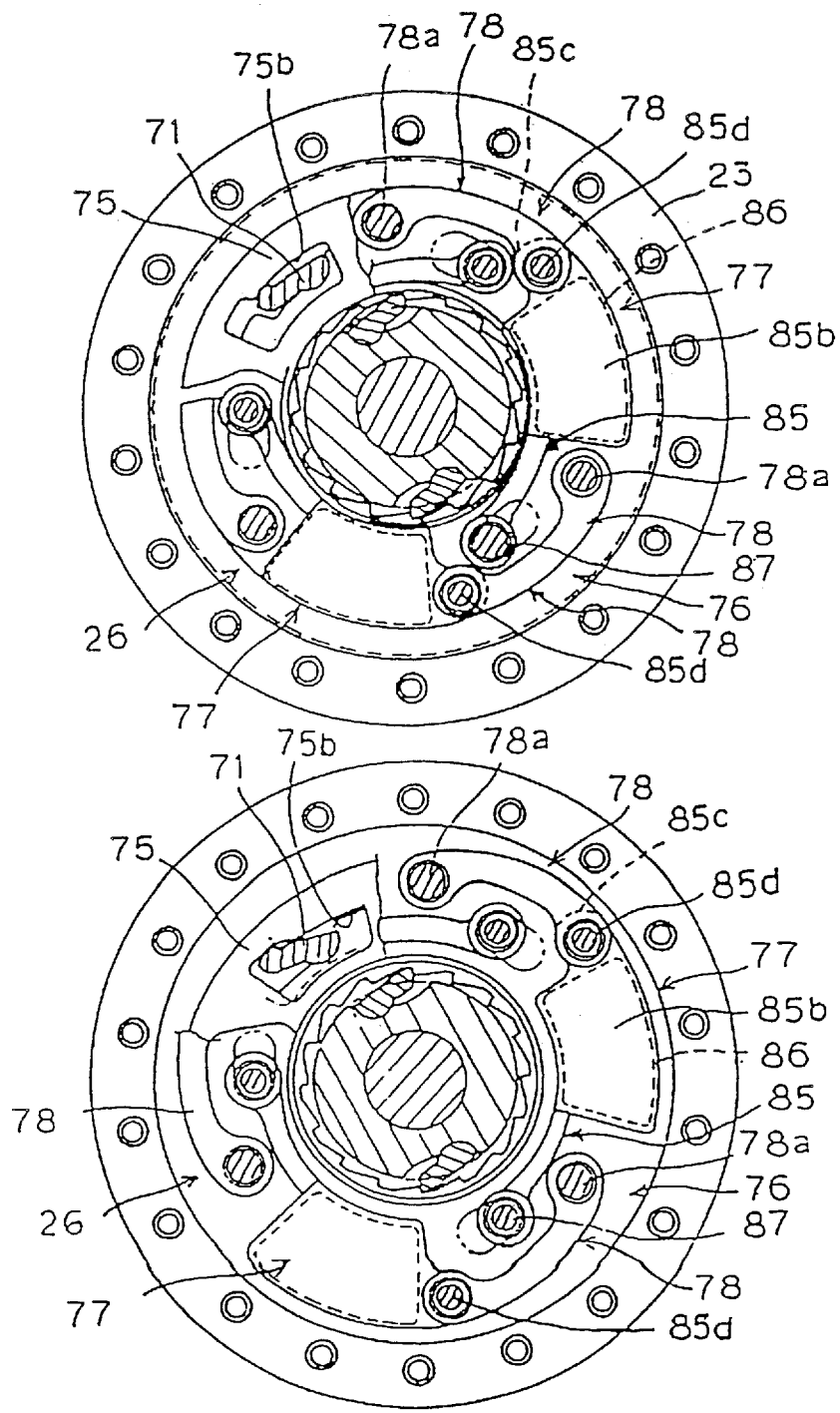
FIG. 11 (A) is a view showing the clutch mechanism shown in FIG. 10 in a disengaged state.

As shown in FIG. 11, the clutch-switching mechanism 26 comprises an annular control plate 75 and a moving mechanism 76 for moving the control plate 75 in a circle about the hub axle. The control plate 75 is supported by a power transmitting body 61 between the engaged position shown in FIG. 11b and the disengaged position shown in FIG. 11a, while allowed to rotate in a circle about the hub axle. Control windows 75b for controlling the clutch pawls 71 are formed between the inner and outer circumferences of the control plate 75. These control windows 75b are configured in the same manner as in the embodiment described above, and one end of each clutch pawl 71 is inserted into these windows. The control plate 75 is normally biased by a spring mechanism (not shown) into the disengaged position shown in FIG. 11a.

The moving mechanism 76 comprises three rocking weight members 77, links 78 for coupling the weight members 77 and the control plate 75, and a spring mechanism (not shown) for biasing the control plate 75 in the clockwise direction in FIG. 11. The weight members 77 comprise weight retainers 85 swingably mounted on the end face 61c (FIG. 10) of the power transmitting body 61 between the first position shown in FIG. 11a and the second position shown in FIG. 11b (the second position is external in relation to the first position). The weight members 77 also have weights 86 mounted on the tips of the weight retainers 85. The three weight retainers 85 are disposed in the same way 120 degrees from each other around the power transmitting body 61. Bosses 85a serving as rocking centers are formed on the bases of the weight retainers 85, and weight mounting sections 85b that accommodate the weights 86 in their interiors are formed on the tips. In addition, link bosses 85c are formed in those areas of the weight mounting sections 85b that are closer to the tips. A rocking axle 87 whose base tip is fixed to the end face 61c of the power transmitting body 61 is mounted on the bosses 85a. Link pins 85d are mounted on the link bosses 85c.

The links 78 are members designed for linking the control plate 75 and the tips of the weight retainers 85 and for moving the control plate 75 in a circle about the hub axle in response to the rocking movement of the tips of the weight members 77. One end of each link 78 is rotatably supported by a link pin 85d, and the other end is rotatably supported by a link pin 78a, which is mounted in the control plate 75.

All other structural features and shifting operations are the same as in the above embodiment, and their description is therefore omitted.

In this embodiment, the control plate 75 is still linked to the tips of the weight members 77 via links 78, thus making it possible to increase the circular movement of the control plate in relation to the swinging of the weight members 77. In addition, shifting can be performed in accordance with the bicycle speed because the weight members 77 are mounted on the slave 23.

Figure 12:
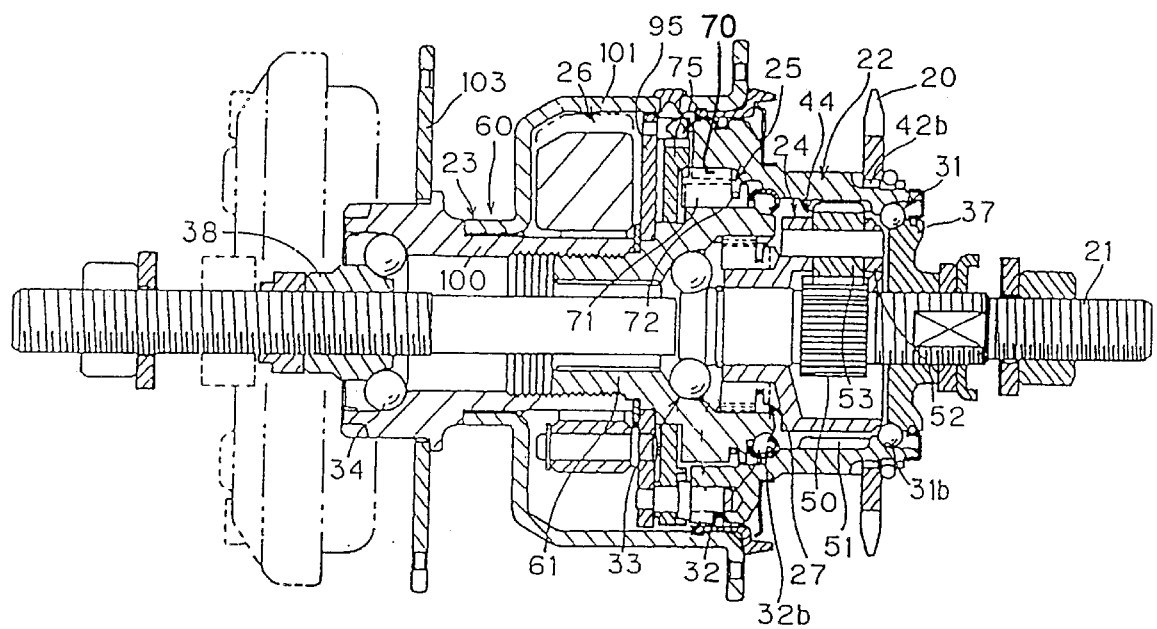
FIG. 12 is a cross sectional view of another embodiment of an internal shifter hub according to the present invention.

In the two embodiments described above, weight members 77 were mounted on the slave 23, but it is also possible to mount the weight members 77 on the driver 22, as shown in FIG. 12. When the weight members 77 are swung by the rotation of the driver 22 in such a manner, the rider can securely shift gears at will because shifting is impossible to perform unless force is applied to the pedals. In the description that follows, the same symbols are used to denote identical or similar members, and only the significant differences between the structures are described.

In FIG. 12, the internal shifter hub 10, which is primarily used on street bikes in the same manner as in the second embodiment, comprises a hub axle 21, a driver 22, a slave 23, a planet gear mechanism 24, a clutch mechanism 25, a clutch-switching mechanism 26, and a one-way clutch 27. The driver 22 has a one-piece structure in the same manner as in the embodiment shown in FIG. 10. A housing space 44 for accommodating the planet gear mechanism 24 is formed inside the driver 22, and a sprocket attachment section 42b consisting of serrations is formed on the outer peripheral surface at the end of the driver 22. The inner-tooth gear 51 of the planet gear mechanism 24 is formed on the inner peripheral surface of the driver 22. In addition, arm-shaped ball race surfaces 31b and 32b for the bearing components 31 and 32, respectively, are formed such that the inner-tooth gear 51 is sandwiched between them. In all other respects, the structure of the bearing components 31 and 32 is the same as in the embodiments described above. Ratchet teeth 70 that are shaped as sawteeth and that constitute the clutch mechanism 25 are formed on the inner peripheral surface of the left end of the driver 22 in the peripheral direction (for example, at six equidistant positions).

The slave 23 has a hub shell 60 and a power transmitting body 61 which is fixed by being screwed into the hub shell 60. The hub shell 60 has a cylindrical component 100, a right hub flange 101 riveted to the right end of the cylindrical component 100, and a left hub flange 103 riveted to the outer peripheral surface at the left end of the cylindrical component 100. All these components may be made from a rolled steel designed for common structural applications. The right hub flange 101 is a member shaped as a stepped cylinder and provided on the inside with a space for accommodating the clutch mechanism 25 or the clutch-switching mechanism 26.

The planet gear mechanism 24 is similar to that shown in FIG. 10, and the planet gears 53 consist of a single gear element. As in the embodiment shown in FIG. 10, the gear ratio $G_R$ will be 0.727 if it is assumed, for example, that the number of teeth Zs on the sun gear 50 is 18, the number of teeth Zr on the inner-tooth gear 51 is 48, and the number of tips Zp of the planet gears 53 is 14.

The clutch mechanism 25 comprises ratchet teeth 70, clutch pawls 71 that mesh with the ratchet teeth 70, and a spring member 72 for energizing the clutch pawls 71. The clutch pawls 71 are swingably mounted on the outer peripheral surface of the power transmitting body 61 while allowed to alternate between an engaged state in which they mesh with the ratchet teeth 70,and a disengaged state in which they are separated from the ratchet teeth 70. As in the embodiments described above, the clutch pawls 71 are controlled by the control plate 75 of the clutch-switching mechanism 26.

Figure 13:
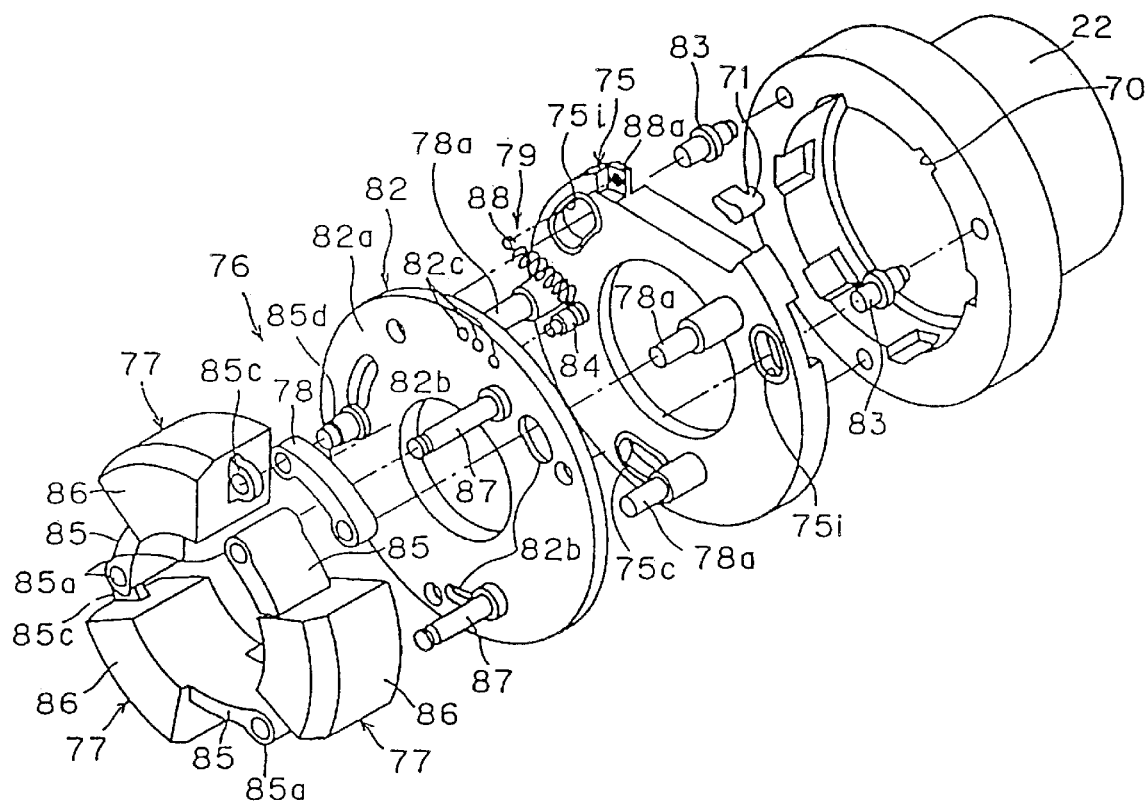
FIG. 13 is an exploded view of the clutch switching mechanism shown in FIG. 12.
Figure 15:
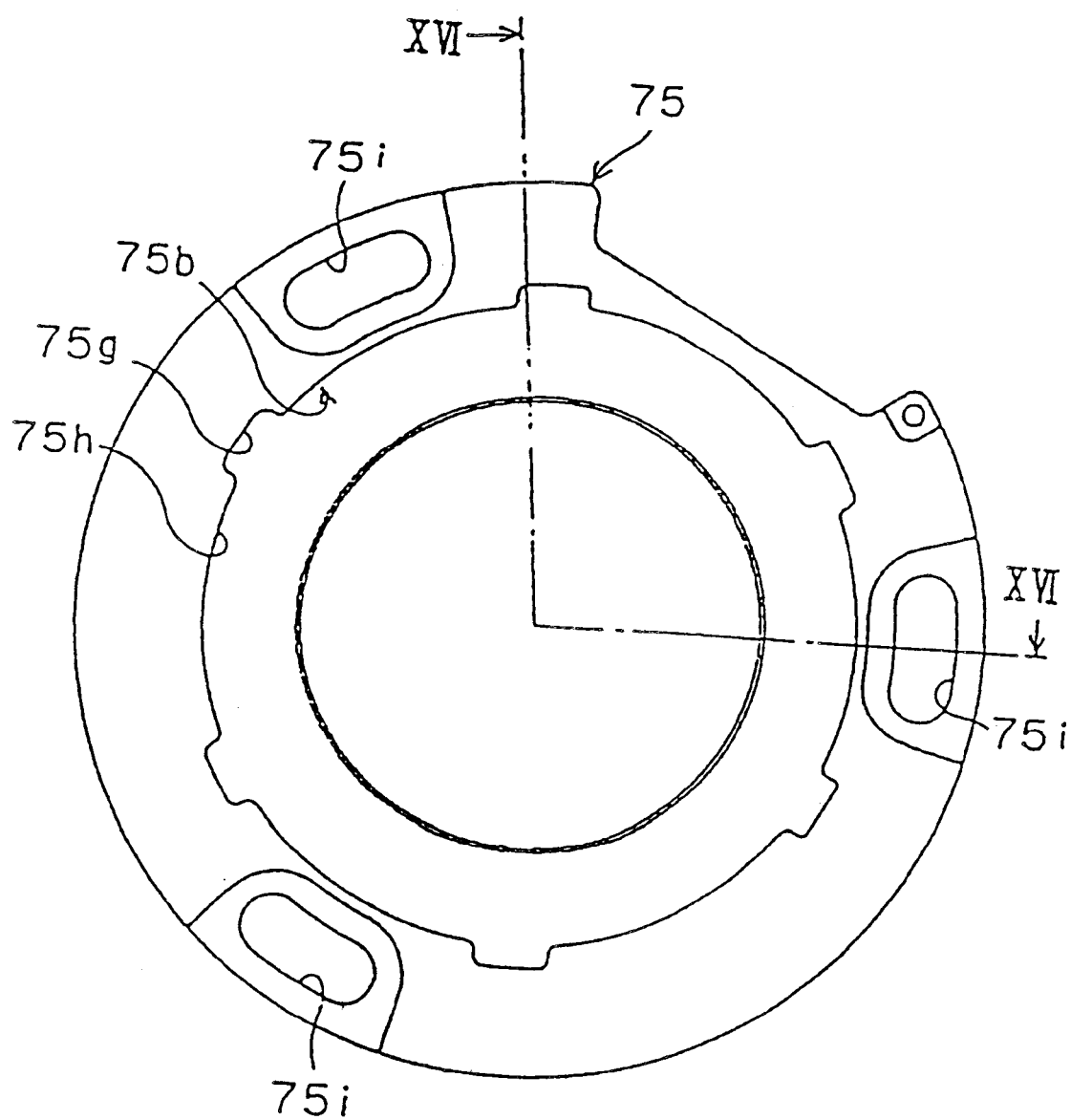
FIG. 15 is a front view of the control plate shown in FIG. 13.
Figure 16:
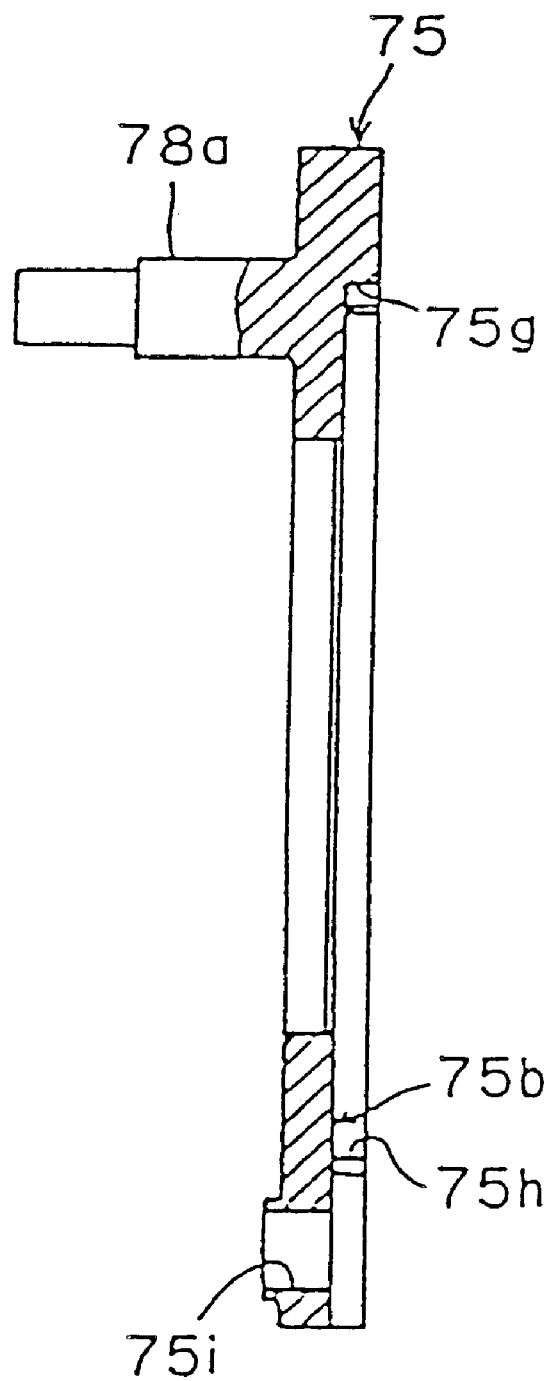
FIG. 16 is a view taken along line XVI—XVI in FIG. 15.

As shown in FIG. 13, the clutch-switching mechanism 26 comprises an annular control plate 75 and a moving mechanism 76 for moving the control plate 75 in a circle about the hub axle. The control plate 75 is supported by a power transmitting body 61 between the engaged position shown in FIG. 14b and the disengaged position shown in FIG. 14a, while allowed to rotate in a circle about the hub axle. The control plate 75 is normally biased toward the disengaged position shown in FIG. 14a by the spring mechanism 79 shown in FIG. 13. Control recesses 75b for controlling the clutch pawls 71 are formed in the right-side surface of the control plate 75, as shown in FIGS. 15 and 16. These control recesses 75b comprise circular disengaging recesses 75f formed by hollowing out the right-side surface of the control plate 75 and large-diameter linking recesses 75g formed in the disengaging recesses 75f at six positions spaced at regular intervals in the peripheral direction. The linking recesses 75g are formed at positions that have the same phases as the ratchet teeth 70 when the control plate 75 is in the linked position. Consequently, the clutch pawls 71 mesh with any of the ratchet teeth 70, and rotation in the traveling direction alone is transmitted directly from the driver 22 to the power transmitting body 61 when the control plate 75 is in the engaged position, and one end of the clutch pawls 71 rests against the linking recesses 75g of the control recesses 75b. In addition, the driver 22 and the power transmitting body 61 are disengaged, and rotation that has been reduced in speed by the planet gear mechanism 24 is transmitted from the carrier 52 to the power transmitting body 61 via the one-way clutch 27, when the control plate 75 reaches a disengaged position and the clutch pawls 71 are pressed against the disengaging recesses 75f.

As shown in FIG. 13, the moving mechanism 76 comprises three rocking weight members 77, three links 78 for linking the weight members 77 and the control plate 75, a spring mechanism 79 for biasing the control plate 75 clockwise in FIG. 14, and a discoid weight support 82 disposed between the control plate 75 and the weight members.

Figures 14A, 14B:
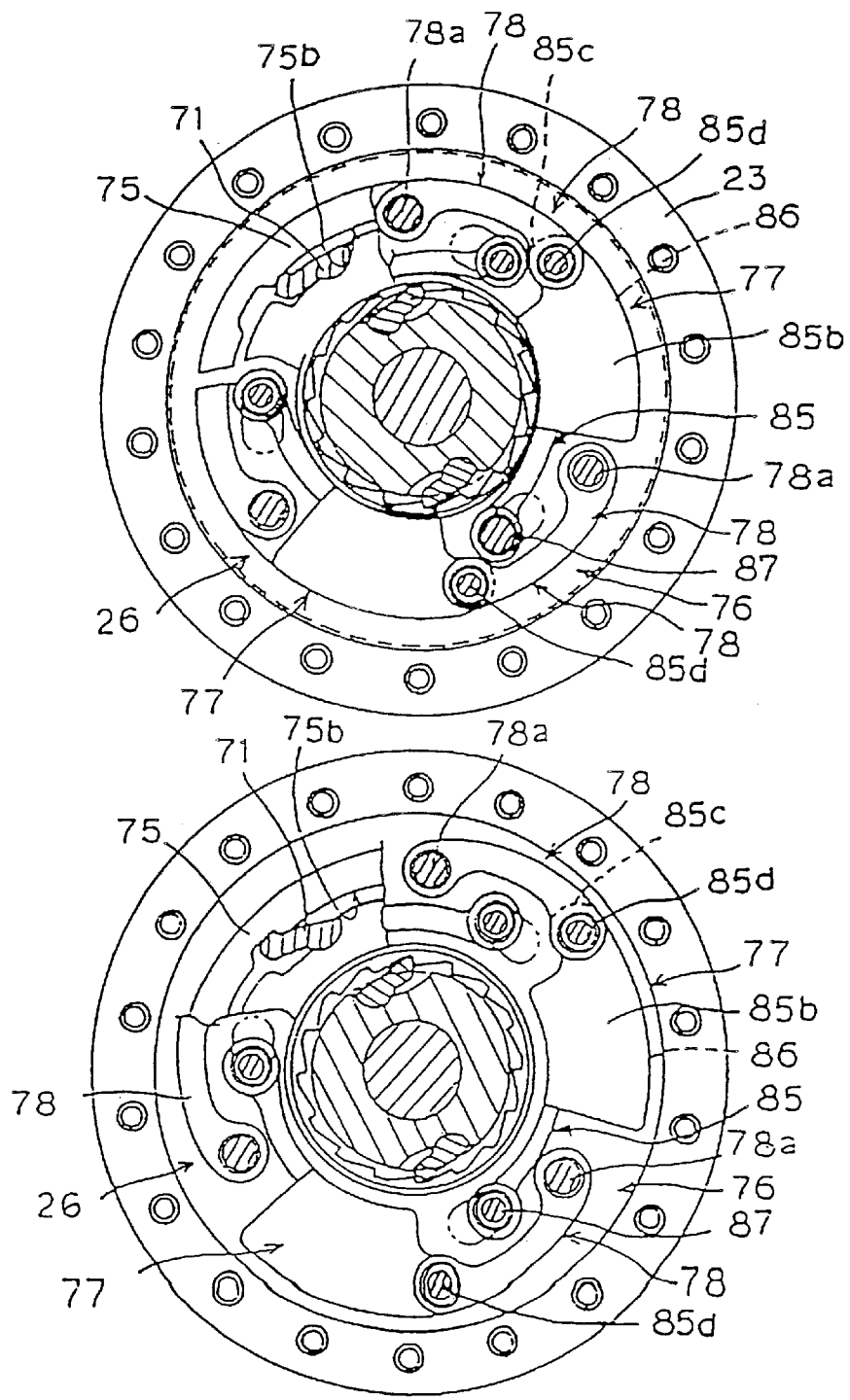
FIG. 14(A) is a view showing the clutch mechanism shown in FIG. 13 in a disengaged state.
FIG. 14(B) is a view showing the clutch mechanism shown in FIG. 13 in an engaged state.

The weight members 77 comprise, for example, zinc weight retainers 85 swingably mounted on the weight support 82 between the first position shown in FIG. 14a and the second position shown in FIG. 14b (the second position is radially outwardly from the first position). The weight members 77 also have weights 86 which are shaped such that one of their ends is mounted on the tips of the weight retainers 85. The three weight retainers 85 are disposed in the same way 120 degrees from each other around the power transmitting body 61. Bosses 85a serving as rocking centers are formed on the bases of the weight retainers 85, and link bosses 85c are formed on their tips. Rocking axles 87 whose tips are fixed to the left-side surface of the weight support 82 are mounted in the bosses 85a. Link pins 85d are mounted in the link bosses 85c.

The links 78 are members designed for linking the control plate 75 and the tips of the weight retainers 85 and for rotating the control plate 75 in a circle about the hub axle in response to the rocking movement of the tips of the weight members 77. One end of each link 78 is rotatably supported by a link pin 85d, and the other end is rotatably supported by a link pin 78a, which is positioned upright on the control plate 75.

The weight support 82 is fixed at a distance from the driver 22 in the axial direction of the hub axle 21 with the aid of three fixing pins 83 positioned upright on the left-side surface of the driver 22. The control plate 75 is disposed between the driver 22 and the weight support 82. For this reason, slits 75i for passing the fixing pins 83 are formed in the control plate 75 at three locations spaced in the peripheral direction. In addition, through holes 82b for passing the link pins 78a designed to link the links 78 and the control plate 75 are formed at three locations spaced in the peripheral direction because the weight support 82 is disposed between the control plate 75 and the weight members 77.

The spring mechanism 79 has a compressed coil spring 88, which is attached at one end to the control plate 75 and at the other end to the weight support 82 through the intermediary of a lock pin 84. The control plate 75 is provided with a spring stopper 88a, and the weight support 82 is provided with three lock holes 82c. The swing start timing of the weight members 77 can be set at three different levels by mounting the lock pin 84 in one of the lock holes 82c.

Because in this arrangement the weight members 77 are mounted on the driver 22 with the aid of the weight support 82, the control plate 75 is brought into the disengaged position by the spring mechanism 79 and a downshifted state is maintained as long as the driver 22 does not rotate. When the rider starts pedaling, the driver 22 is rotated, and when its rotation exceeds a certain rotational speed (which is determined by the biasing force of the spring mechanism, the mass of the weights 86, or the like), the weight members 77 swing outward, and a direct-linked state is established. Gears can therefore be shifted in a secure manner according to rider preferences.

In the particular case of bicycles ridden at comparatively low speeds, such as street bikes, shifting gears by rotation on the side of the slave 23 impairs pedaling and causes fatigue when direct linkage is established following resumed pedaling. This drawback can be overcome, however, by mounting the weight members 77 on the driver 22. It should be noted that because the shift timing is slow, it is better to mount the weight members 77 on the slave 23 in the case of racing bicycles ridden at high speeds. All other structural features and shifting operations are the same as in the above embodiments, and their description is therefore omitted. In any event, the control plate 75 is still linked to the tips of the weight members 77 via links 78 (as in the embodiments described above), thus making it possible to increase the circular movement of the control plate in relation to the swinging of the weight members 77.

Figure 17:
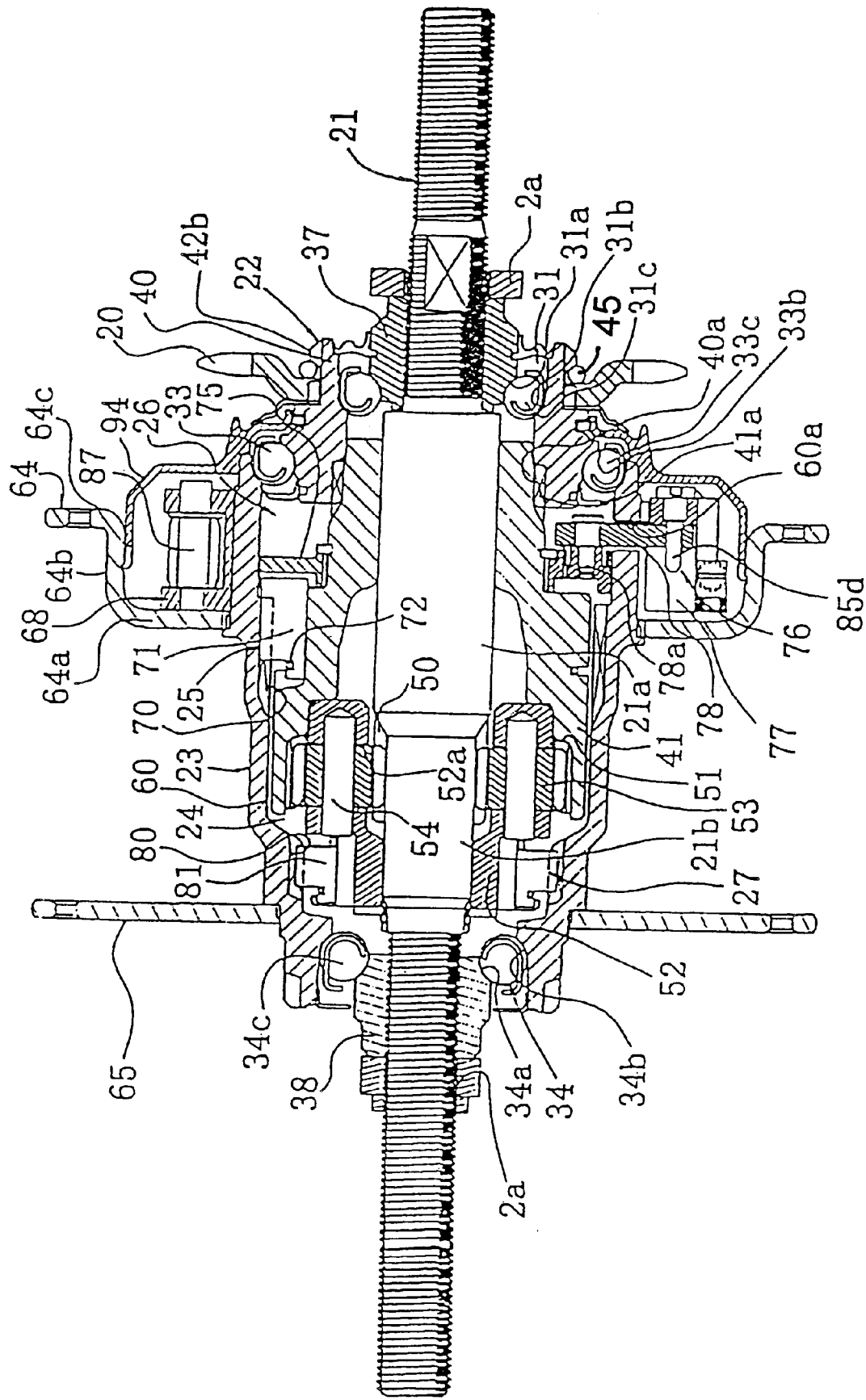
FIG. 17 is a cross sectional view of another embodiment of an internal shifter hub according to the present invention.

FIG. 17 is a cross sectional view of another embodiment of an internal shifter hub according to the present invention. As shown in FIG. 17, weight members 77 are mounted on a slave 23 in the same manner as in the embodiment shown in FIGS. 2–11, but the weight members 77 are disposed farther outward in relation to the slave 23, thus enhancing the centrifugal force acting on the weight members 77. In addition, the planet gear mechanism 24 is disposed on the left side of FIG. 17 (unlike the previous embodiments), thus reducing the torque applied to the hub axle 21. In the description that follows, the same symbols are used to denote identical or similar members, and only the significant differences between the structures are described.

In FIG. 17, the internal shifter hub 10, which is primarily used on street bikes, comprises a hub axle 21, a driver 22, a slave 23, a planet gear mechanism 24, a clutch mechanism 25, a clutch-switching mechanism 26, and a one-way clutch 27. The hub axle 21 is a member that is fixed to the rear fork ends 2a of a bicycle frame body 2. A large-diameter portion 21a is formed on the hub axle 21 somewhat to the right of the central section, and the sun gear 50 of the planet gear mechanism 24 is formed on the border with a small-diameter portion 21b on the left side of the large-diameter portion 21a. Hub cone members 37 and 38 having arm-shaped hub cone surfaces 31a and 34a for bearing components 31 and 34, respectively, are screwed onto the mounting portions of the hub axle 21 that lie inward in relation to the rear fork ends 2a.

The driver 22 is a member for transmitting the rotation of a sprocket 20. The driver 22 comprises a first cylindrical component 40 (the right end of this component is rotatably supported by the bearing component 31), and a second cylindrical component 41 that is nonrotatably linked to the first cylindrical component 40 and is rotatably supported by the hub axle 21. A sprocket attachment section 42b formed by outer serrations is formed on the outer peripheral surface at the right end of the first cylindrical component 40, and a snap ring 45 for fixing the sprocket 20 is secured therein. A hub cone surface 33a for a bearing component 33 is formed on the outer peripheral surface at the left end of the first cylindrical component 40. A ball race surface 31b for the bearing component 31 is formed on the inner peripheral surface at the right end of the first cylindrical component 40, and inner serrations 40a are formed on the inner peripheral surface of the left end. The bearing components 31, 33, and 34 comprise, respectively, the hub cone surfaces 31a, 33a, and 34a; the ball race surfaces 31b, 33b, and 34b; and a plurality of balls 31c, 33c, and 34c interposed between the two surfaces. The ball race surfaces 33b and 34b are formed in a respective manner on the inner peripheral surfaces at the right and left ends of the slave 23.

Figure 18:
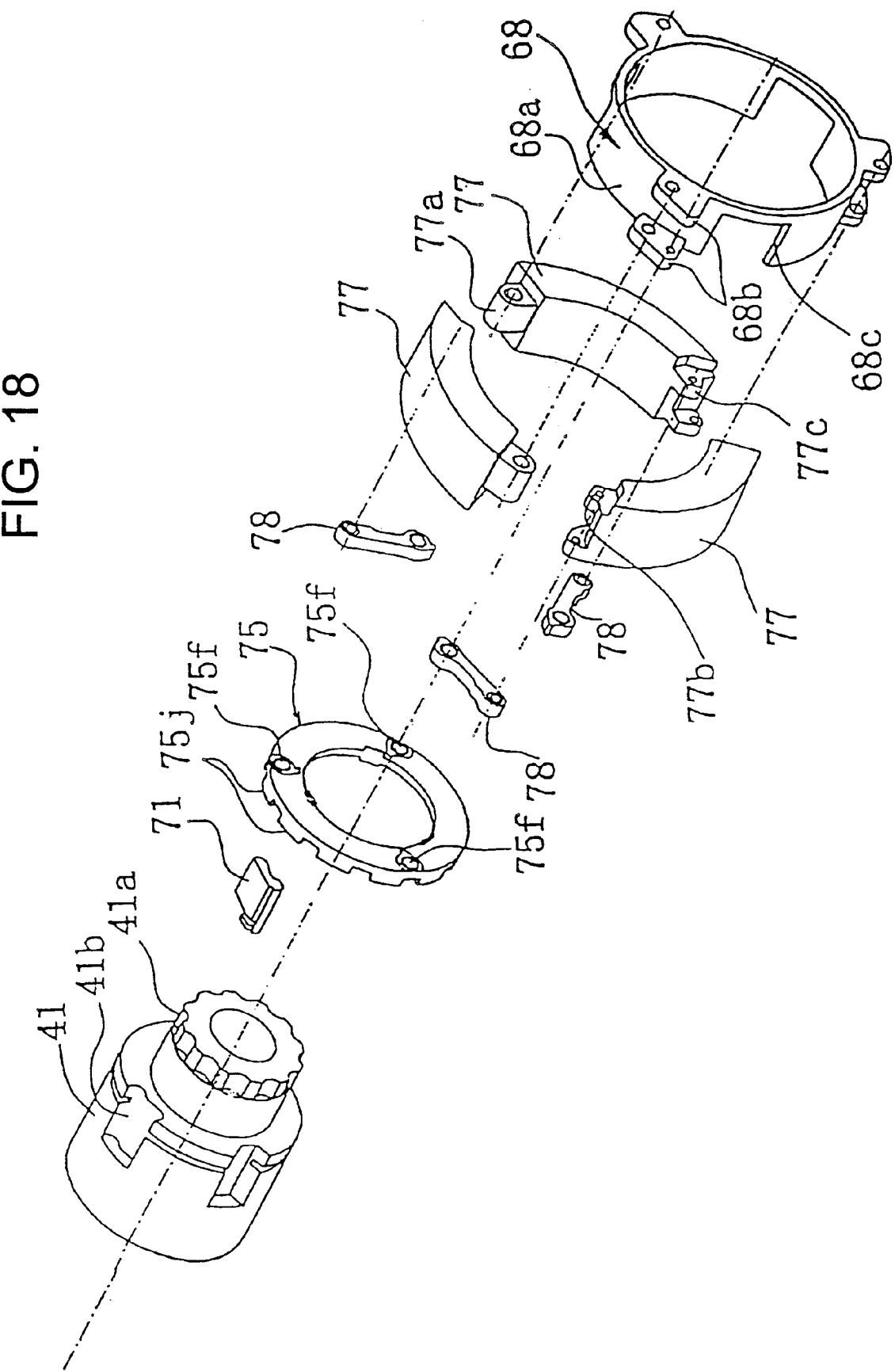
FIG. 18 is an exploded view of the clutch switching mechanism shown in FIG. 17.

The second cylindrical component 41 is a member that is extended in the axial direction and is nonrotatably linked with the inner peripheral surface of the first cylindrical component 40. The clutch mechanism 25 and the clutch-switching mechanism 26 are disposed around the outside of the second cylindrical component 41. The outer peripheral surface at the right end of the second cylindrical component 41 has a smaller diameter than the outer peripheral surface of the left end, and external serrations 41a for engagement by the internal serrations 40a of the first cylindrical component 40 are formed thereon. In addition, the outer peripheral surface of the large-diameter portion is provided with the housing recesses 41b (FIGS. 18 and 19) for clutch pawls 71, which are components of the clutch mechanism 25. The inner-tooth gear 51 of the planet gear mechanism 24 is formed on the inner peripheral surface at the left end of the large-diameter portion.

Forming the driver 22 in such a manner into a two-part structure composed of the first cylindrical component 40 and second cylindrical component 41 makes it possible to mount the planet gear mechanism 24 left of center on the hub axle 21 and to position the clutch mechanism 25 and the clutch-switching mechanism 26 between the two components in a compact arrangement. The outside diameter of the entire hub can therefore be reduced.

The slave 23 is a cylindrical member driven by the driver 22 and is designed for rotating the rear wheel 7. The slave 23 comprises a hub shell 60 disposed around the outside of the driver 22 and a couple of hub flanges 64 and 65 designed for securing the spokes and nonrotatably fixed around the outside of the hub shell 60 at a distance from each other in the axial direction. The hub shell 60, which is a stepped cylindrical member (made of a chromium-molybdenum steel, for example) gradually tapering off toward the left end thereof, houses in its interior the driver 22, the clutch mechanism 25, the clutch-switching mechanism 26, and the like. Ratchet teeth 70 for the clutch mechanism 25 and ratchet teeth 80 for the one-way clutch 27 are formed at regular intervals on the inner peripheral surface of the hub shell 60. Openings 60a for passing the links 78 (described below) of the clutch-switching mechanism 26 are formed at three locations in the peripheral direction in the hub shell 60.

The hub flange 64 is nonrotatably riveted to the outer peripheral surface of the hub shell 60. The hub flange 64 comprises a first annular component 64a fixed to the hub shell 60, a cylindrical component 64b extending outward in the axial direction from the outer edge of the first annular component 46a, and a second annular component 64c extending radially outward from the cylindrical component 64b. A space for housing the weight members 77 (described below) of the clutch-switching mechanism 26 is formed around the inside of the cylindrical component 64b of the hub flange 64. This space is covered with a synthetic-resin cover 94. The hub flange 65 is an annular member nonrotatably riveted to the left end of the hub shell 60.

The planet gear mechanism 24 comprises the sun gear 50 formed on the hub axle 21, the inner-tooth gear 51 formed on the second cylindrical component 41 of the driver 22, a carrier 52 rotatably mounted on the small-diameter portion 21b of the hub axle 21, and three planet gears 53 rotatably supported on the carrier 52. The carrier 52 is a member shaped as a collar flange with the hub axle 21 passing through it, and three gear housings 52a spaced at regular intervals in the peripheral direction are formed on the outer peripheral surface of this member. Three gear axles 54 for rotatably supporting the planet gears 53 are fixed to the carrier 52. The planet gears 53 mesh with the inner-tooth gear 51.

As shown in FIG. 17, the clutch mechanism 25 has ratchet teeth 70 formed as sawteeth on the inner peripheral surface of the hub shell 60, clutch pawls 71 that are disposed on the outer peripheral surface of the second cylindrical component 41 of the driver 22 and that are capable of meshing with the ratchet teeth 70, and a spring member 72 for biasing the clutch pawls 71. The clutch pawls 71 are mounted while allowed to alternate between an engaged state in which they mesh with the ratchet teeth 70, and a disengaged state in which they are separated from the ratchet teeth 70. The spring member 72, which is positioned in a wound state in a groove 74 formed in the outer peripheral surface of the second cylindrical component 41, pushes the clutch pawls 71 into the engaged state. It is only when the clutch pawls 71 are in an engaged state and the driver 22 rotates in the traveling direction that the rotation of the clutch mechanism 25 is transmitted to the hub shell 60 of the slave 23.

As shown in FIGS. 17 through 20, the clutch-switching mechanism 26 comprises a control plate 75 for switching the clutch pawls 71 between an engaged state and a disengaged state, a moving mechanism 76 for moving the control plate 75 in a reciprocating fashion about the hub axle, and a weight support 68. The control plate 75 is a flat annular member rotatably supported in its central portion on the small-diameter portion of the second cylindrical component 41. A plurality of clutch-controlling protrusions 75j extending in the axial direction are formed on the outer edge of the control plate 75 at regular intervals in the peripheral direction. The intervals between the control protrusions 75j are equal to the intervals between the ratchet teeth 70 formed in the hub shell 60. The tips of the clutch pawls 71 facing the moving mechanism 76 are disposed such that they can touch the control protrusions 75j along their inner circumference. The control protrusions 75j are designed for holding the clutch pawls 71 in a disengaged state, and, as shown in FIG. 21b, a disengaged state is established when the clutch pawls 71 are positioned between the control protrusions 75j. In addition, link mounting components 75f for rotatably mounting the links 78 of the moving mechanism 76 described below are formed on the outer edges of the surface on the opposite side from the sections constituting the control protrusions 75j of the control plate 75. The controlling arrangement for the clutch pawls 71 is thus simplified because the state of the clutch pawls 71 is controlled with the aid of the control protrusions 75j and the gaps therebetween.

In addition, providing numerous control protrusions 75j makes it possible to accelerate shifting even when the clutch pawls 71 and the control plate 75 rotate in relation to each other.

The weight support 68 is nonrotatably mounted on the right side of the hub flange 64 along the outer peripheral surface of the hub shell 60. The weight support 68 comprises a cylindrical component 68a fixed to the outer peripheral surface of the hub shell 60 and two hinge components 68b that extend radially outward and that are disposed on the outer peripheral surface of the cylindrical component 68a at regular intervals in the peripheral direction. The cylindrical component 68a is provided with openings 68c for accommodating the links 78. The weight members 77 of the moving mechanism 76 are swingably supported by the hinge components 68b.

Figure 19:
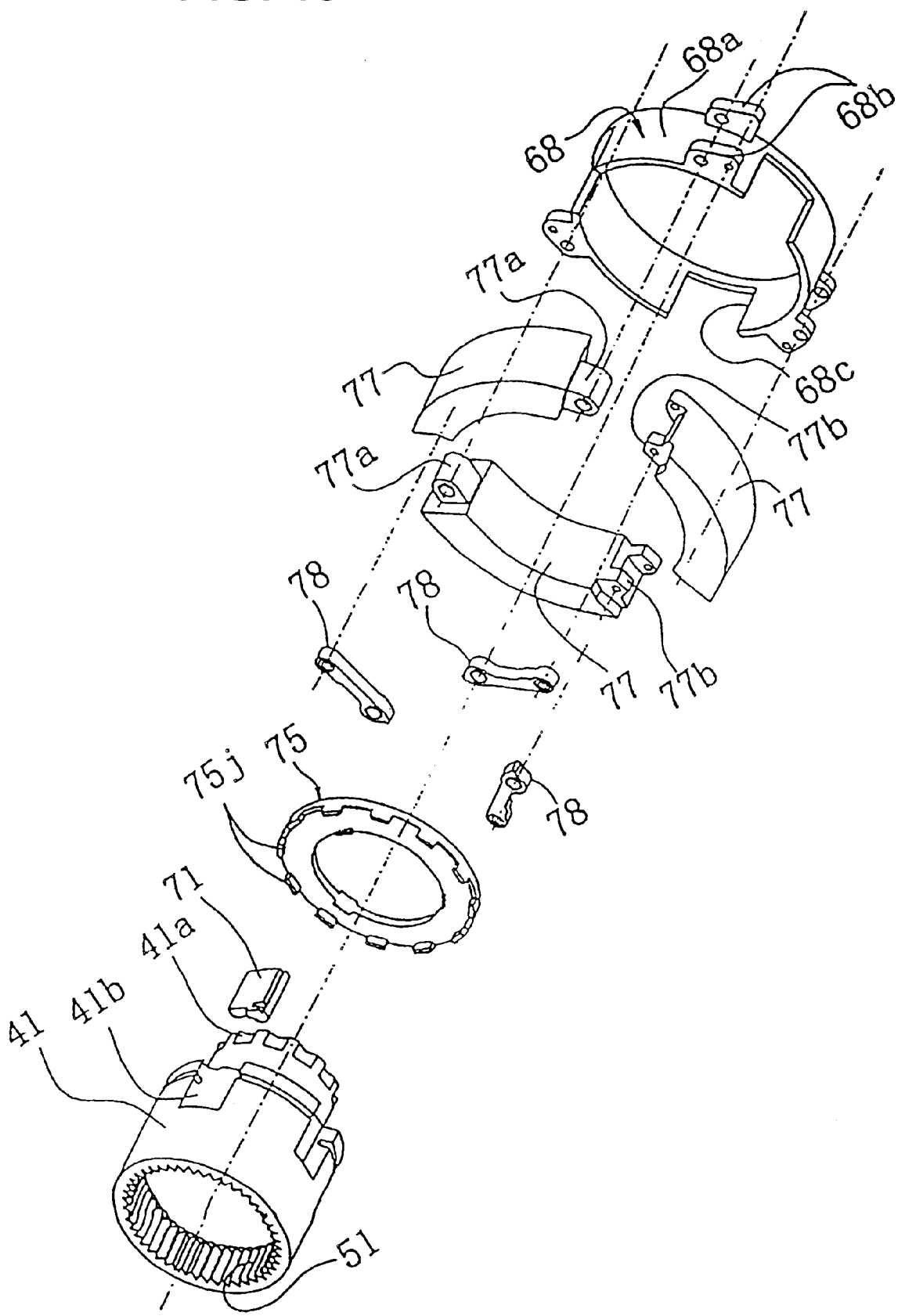
FIG. 19 is a reverse exploded view of the clutch switching mechanism shown in FIG. 17.

The moving mechanism 76, which is disposed on the right side of the control plate 75, comprises three rocking weight members 77, links 78 for coupling the three weight members 77 and the control plate 75, and a spring mechanism 79 for energizing the weight members 77 counterclockwise in FIG. 19. The weight members 77 are swingably mounted on the hinge components 68b of the weight support 68. The weight members 77 are shaped such that they form a curve around the cylindrical component 68a of the weight support 68, and they are positioned in the same way 120 degrees apart from each other around the weight support 68. Bosses 77a are formed integrally with the bases of the weight members 77, and link mounting components 77b are formed integrally with the tips of the weight members. Rocking axles 87 pass through the bosses 77a. Both ends of the rocking axles 87, which pass through the bosses 77a, are fixed to the hinge components 68b. Link pins 85d are fixed to the link mounting components 77b. The link pins 85d are designed for the rotatable mounting of the links 78.

The links 78 are members for rotating the control plate 75 in response to the movement of the tips of the weight members 77, which swing about their bases. The control plate 75 and the tips of the weight members 77 are linked at both ends thereof. The links 78 are flat members made of metal. One end of each link is provided with a round hole for inserting the link pins 85d, and the other end is provided with a round hole for inserting a link pin 78a, which is used to achieve linkage with the control plate 75. The link mounting components 77b are passed through the openings 60a and 68c from positions of linkage with the weight members 77, are extended radially outward, and are linked to the control plate 75.

The spring mechanism 79 comprises three coil springs 88 secured at one end in the tips of the weight members 77 and at the other end in the hinge components 68b. The coil springs 88, which bias the weight members 77 into a disengaged state, allow shift timing to be adjusted by varying the spring force thereof.

As shown in FIG. 17, the one-way clutch 27, which may be a pawl type, comprises ratchet teeth 80 formed on the inner peripheral surface of the hub shell 60, clutch pawls 81 mounted on the outer peripheral surface of the carrier 52 of the planet gear mechanism 24 while allowed to alternate between an engaged state and a disengaged state, and a spring member (not shown) for biasing the clutch pawls 81 into an engaged state. In the one-way clutch 27, the clutch pawls 81 are normally raised into a linked state, and the rotation of the carrier 52 is transmitted to the hub shell 60 when this carrier rotates in the traveling direction. No rotation is transmitted when the hub shell 60 rotates in the traveling direction at a higher speed than does the carrier 52.

As with the embodiment shown in FIGS. 2–9, the internal shifter hub 10 in Embodiment 4 thus configured has the following paths:

a downshifted power transmission path composed of the driver 22, inner-tooth gear 51, planet gear mechanism 24, carrier 52, and slave 23; and a direct-coupled power transmission path composed of the driver 22, clutch mechanism 25, and slave 23.

When the rider steps on the pedals to propel the bicycle during startup, the resulting rotation is transmitted to the driver 22 via the sprocket 20. At this time, the control plate 75 is in the disengaged position shown in FIG. 20a, and the clutch pawls 71 are held in a disengaged state by the control plate 75. In the disengaged position, the control protrusions 75j and the ratchet teeth 70 are disposed alternately as shown in FIG. 21a, and the clutch pawls 71 are restrained by the control protrusions 75j and are held in the disengaged state. Consequently, there is no linkage between the driver 22 and the hub shell 60, and the rotation of the driver 22 is transmitted to the hub shell 60 along the downshifted power transmission path. As a result, the rotation of the sprocket 20 during startup is transmitted to the hub shell 60 after being reduced in speed. It is therefore possible to lightly step on the pedals during startup.

Figure 20A:
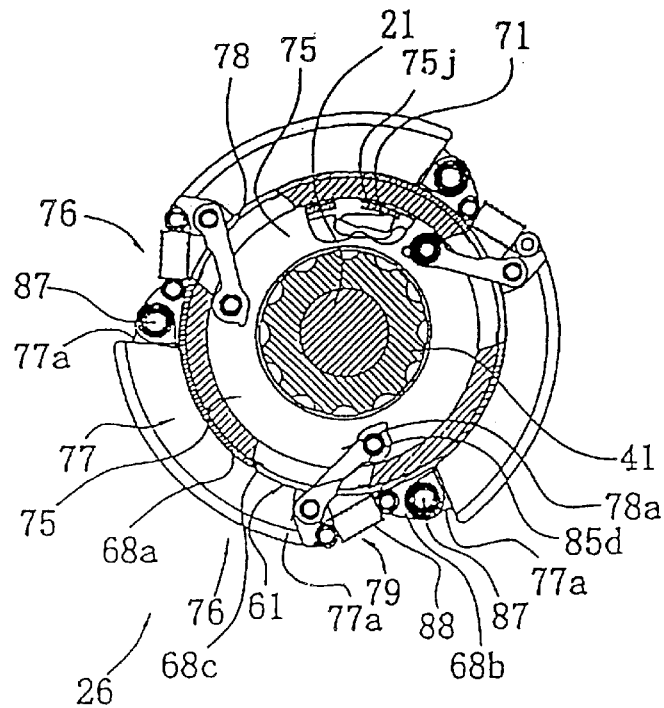
FIG. 20(A) is a view showing the clutch mechanism shown in FIG. 18 in a disengaged state.
Figure 20B:
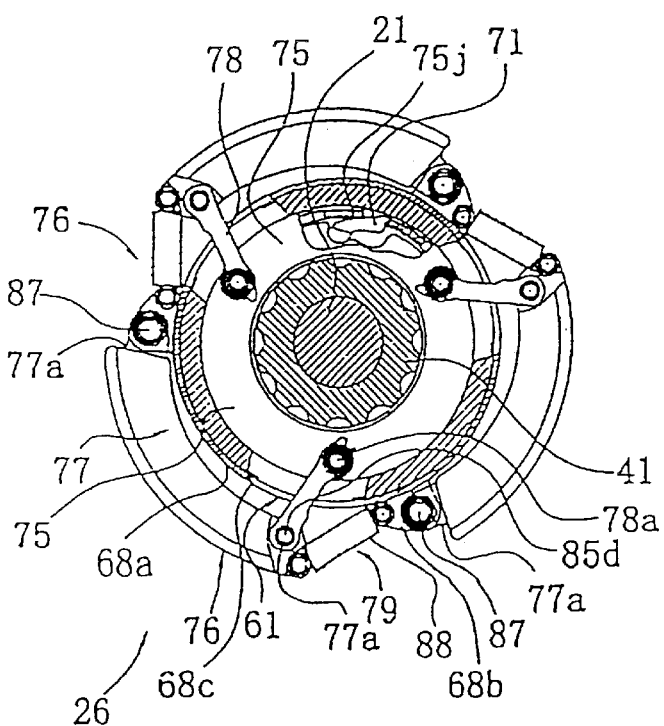
FIG. 20(B) is a view showing the clutch mechanism shown in FIG. 18 in an engaged state.

Moving against the action of the biasing force exerted by the coil springs 88, the weight members 77 swing outward from the disengaged position into the engaged position shown in FIG. 20b when the hub shell 60 achieves a rotational speed above a certain level. This level is determined by the spring characteristics of the spring mechanism 79 or by the mass of the weight members 77. When this happens, the control plate 75 is rotated clockwise from the disengaged position shown in FIG. 20a to the engaged position shown in FIG. 20b through the intermediary of the links 78. When the control plate 75 has reached the engaged position, the control protrusions 75j and the ratchet teeth 70 are in the same phase, as shown in FIG. 21b. When the clutch pawls 71 are disposed between the control protrusions 75j, the restraining effect of the control protrusions 75j is released, the tips of the clutch pawls 71 separate from the control protrusions 75j, and the clutch pawls 71 are raised into the engaged state by the biasing force of the spring member 72. As a result, the tips of the clutch pawls 71 engage the ratchet teeth 70, the rotation of the driver 22 in the traveling direction is transmitted directly to the power transmitting body 61 along the direct-coupled power transmission path, and the rotation of the sprocket 20 is transmitted unchanged to the rear wheel 7. Consequently, an upshift is performed once the rotational speed has exceeded a certain level.

There is no reduction in the transmission efficiency of the planet gear mechanism 24 during this regular ride because the driver 22 and the slave 23 are coupled directly. In this embodiment as well, the control plate 75 is still linked to the tips of the weight members 77 via the links 78, thus making it possible to increase the circular movement of the control plate in relation to the swinging of the weight members 77. Because at this time the weight members 77 are disposed on the outside of the hub shell 60, large centrifugal forces can be applied to the weight members 77 even when the rotational speed is low. Better response can therefore be achieved during shifting, and gears can be changed faster.

When the rotational speed of the hub shell 60 drops below a prescribed level during cornering or the like, the weight members 77 are returned to their initial disengaged state by the coil springs 88, the clutch pawls 71 are brought into a disengaged state by the control protrusions 75j, and the rotation of the driver 22 is transmitted to the slave 23 along the downshifted power transmission path.

While the above is a description of various embodiments of the present invention, further modifications may be employed without departing from the spirit and scope of the present invention. For example, the size, shape, location or orientation of the various components may be changed as desired. The functions of one element may be performed by two, and vice versa.

The structure of the power transmitting mechanism is not limited to a planet gear mechanism alone and may also include cyclo shifters (registered trade name) and other shifting mechanisms. The structure of the interlocking members for moving the control member in response to the movement of the weight members is not limited to links alone and may also include structures containing sliding pins and slits, cam-containing structures, and other structures in which the control plate is caused to move in a circle in response to the movement of those ends of the weight members that lie on the opposite side from the center of rocking of these members.

In the embodiments described above, the speed was changed from downshifted to directly coupled, but changing the speed from directly coupled to upshifted is also possible. In this case, the driver 22 should be linked to the carrier 52, and power should be transmitted from the carrier 52 to the inner-tooth gear 51, as shown in FIG. 4b. At this time, a wide range of gear ratios can be obtained with an inner-tooth gear whose outside diameter is less than that of a single gear element if the second gear element 53b (which, of the two gear elements 53a and 53b, has the larger diameter) is caused to mesh with the inner-tooth gear 51, and the small-diameter first gear element 53a is caused to mesh with the sun gear 50. In addition, the carrier 52 and the driver 22 should be linked together with the aid of the structure shown in FIG. 4a if the goal is obtain a gear ratio corresponding to a cross ratio.

Although the embodiment shown in FIG. 17 involved moving the slave 23 in response to the movement of the weight members 77, it is also possible to use a structure in which the weight members 77 are moved in response to the movement of the driver, as in The embodiment shown in FIG. 12.

Thus, the scope of the invention should not be limited by the specific structures disclosed. Instead, the true scope of the invention should be determined by the following claims.

What is claimed is:

1. A bicycle hub transmission comprising:
    a hub axle;
    a driver rotatably mounted to the hub axle;
    a slave rotatably mounted to the hub axle;
    a power transmitting mechanism disposed between the driver and the slave for changing a rotational speed of the driver and for communicating rotational power from the driver to the slave;
    a clutch mechanism for selectively engaging and disengaging the slave and the driver, wherein the clutch mechanism includes:
        a tooth disposed on one of the driver and the slave;
        a pawl disposed in a transmission path between the driver and the slave for swinging between an engaging position for engaging the tooth and a disengaging position for disengaging the tooth; and
        a pawl biasing mechanism for biasing the pawl toward the engaging position; and
    a clutch switching mechanism including:
        an elongated weight member having a first end and a second end, wherein the second end pivots radially outwardly around the first end in response to centrifuigal force created by rotation of the weight member around the hub axle;
        a control member operatively coupled to the clutch mechanism and rotatable about the hub axle between an engaging position for causing the clutch to engage the driver and the slave and a disengaging position for contacting the pawl and thereby disengaging the driver and the slave; and
        an interlocking member coupled to the weight member in a position spaced apart from the first end of the weight member toward the second end of the weight member and coupled to the control member for rotating the control member in response to radially outward movement of the second end of the weight member.

2. The hub transmission according to claim 1 wherein the first end of the weight member is pivotably mounted for rotation with the slave.

3. The hub transmission according to claim 2 wherein the interlocking member comprises a link member having a first end connected to the control member and a second end connected to the weight member.

4. The hub transmission according to claim 3 wherein the second end of the link member is connected to the weight member at the second end of the weight member.

5. The hub transmission according to claim 2 wherein the clutch switching mechanism further comprises a biasing mechanism for biasing the control member toward one of the engaging position or the disengaging position.

6. The hub transmission according to claim 2 wherein the power transmitting mechanism comprises a planetary gear mechanism including:
    an inner-tooth gear disposed on the driver;
    a sun gear disposed on the hub axle;
    a planet gear carrier rotatably mounted around the hub axle and linkable to the slave; and
    a plurality of planet gears rotatably mounted to the planet gear carrier and meshing with the sun gear and the inner-tooth gear.

7. The hub transmission according to claim 6 wherein the inner-tooth gear is integrally formed on an inner peripheral surface of the driver, and wherein the sun gear is integrally formed on an outer peripheral surface of the hub axle.

8. The hub transmission according to claim 6 wherein each of the plurality of planet gears comprise:
    a smaller diameter gear element meshing with the inner-tooth gear; and
    a larger diameter gear element disposed concentrically with the smaller diameter gear element in close proximity thereto and meshing with the sun gear.

9. The hub transmission according to claim 6 further comprising a one-way clutch mechanism disposed between the planet gear mechanism and the slave.

10. The hub transmission according to claim 9 wherein the one-way clutch mechanism is disposed between the planet gear carrier and the slave.

11. The hub transmission according to claim 2 wherein the driver comprises:
    a first driving member; and
    a second driving member axially aligned with the first driving member and nonrotatably coupled to the first driving member.

12. The hub transmission according to claim 11 wherein the slave is disposed around the second driving member.

13. The hub transmission according to claim 11 wherein the power transmission mechanism is disposed between the hub axle and the first driving member.

14. The hub transmission according to claim 11 wherein the power transmission mechanism is disposed between the hub axle and the second driving member.

15. The hub transmission according to claim 1 wherein the first end of the weight member is pivotably mounted for rotation with the driver.

16. The hub transmission according to claim 15 wherein the interlocking member comprises a link member having a first end connected to the control member and a second end connected to the weight member.

17. The hub transmission according to claim 16 wherein the second end of the link member is connected to the weight member at the second end of the weight member.

18. The hub transmission according to claim 15 wherein the clutch switching mechanism further comprises a biasing mechanism for biasing the control member toward one of the engaging position or the disengaging position.

19. The hub transmission according to claim 2 wherein the power transmitting mechanism comprises a planetary gear mechanism including:
    an inner-tooth gear disposed on the driver;
    a sun gear disposed on the hub axle;
    a planet gear carrier rotatably mounted around the hub axle and linkable to the slave; and
    a plurality of planet gears rotatably mounted to the planet gear carrier and meshing with the sun gear and the inner-tooth gear.

20. The hub transmission according to claim 19 wherein the inner-tooth gear is integrally formed on an inner peripheral surface of the driver, and wherein the sun gear is integrally formed on an outer peripheral surface of the hub axle.

21. The hub transmission according to claim 19 further comprising a one-way clutch mechanism disposed between the planet gear mechanism and the slave.

22. The hub transmission according to claim 21 wherein the one-way clutch mechanism is disposed between the planet gear carrier and the slave.

23. A bicycle hub transmission comprising:
    a hub axle;
    a driver rotatable mounted to the hub axle;
    a slave rotatably mounted to the hub axle;
    a power transmitting mechanism disposed between the driver and the slave for changing a rotational speed of the driver and for communicating rotational power from the driver to the slave;
    a clutch mechanism for selectively engaging and disengaging the slave and the driver; and
    a clutch switching mechanism including:
        an elongated weight member having a first end and a second end, wherein the second end pivots radially outwardly around the first end in response to centrifugal force created by rotation of the weight member around the hub axle, and wherein the first end of the weight member is pivotably mounted for rotation with the slave;
        a control member operatively coupled to the clutch mechanism and rotatable about the hub axle between an engaging position for causing the clutch to engage the driver and the slave and a disengaging position for disengaging the driver and the slave;
        an interlocking member coupled to the weight member in a position spaced apart from the first end of the weight member toward the second end of the weight member and coupled to the control member for rotating the control member in response to radially outward movement of the second end of the weight member;
    wherein the slave is partially disposed radially inwardly of the driver, and wherein the clutch mechanism comprises:
        a tooth disposed on an inner peripheral surface of the driver;
        a pawl disposed on an outer peripheral surface of the slave for swinging between an engaging position for engaging the tooth and a disengaging position for disengaging the tooth; and
        a pawl biasing mechanism for biasing the pawl toward the engaging position.

24. The hub transmission according to claim 23 wherein the tooth is shaped so that the clutch mechanism links the driver and the slave for integral rotation when the driver rotates in a first direction and so that the clutch mechanism allows relative rotation between the driver and the slave when the driver rotates in a second direction opposite the first direction.

25. A bicycle hub transmission comprising:
    a hub axle;
    a driver rotatably mounted to the hub axle;
    a slave rotatably mounted to the hub axle;
    a power transmitting mechanism disposed between the driver and the slave for changing a rotational speed of the driver and for communicating rotational power from the driver to the slave;
    a clutch mechanism for selectively engaging and disengaging the slave and the driver; and
    a clutch switching mechanism including:
        an elongated weight member having a first end and a second end, wherein the second end pivots radially outwardly around the first end in response to centrifugal force created by rotation of the weight member around the hub axle;
        a control member operatively coupled to the clutch mechanism and rotatable about the hub axle between an engaging position for causing the clutch to engage the driver and the slave and a disengaging position for disengaging the driver and the slave; and
        an interlocking member coupled to the weight member in a position spaced apart from the first end of the weight member toward the second end of the weight member and coupled to the control member for rotating the control member in response to radially outward movement of the second end of the weight member; and
    wherein the weight member is disposed on an outer peripheral surface of the slave.

26. The hub transmission according to claim 25 wherein the control member is disposed within the slave.

27. The hub transmission according to claim 26 wherein the interlocking member comprises a link member having a first end connected to the control member and a second end connected to the weight member, and wherein the link member extends through the outer peripheral surface of the slave.

28. The hub transmission according to claim 27 wherein the second end of the link member is connected to the weight member at the second end of the weight member.

29. The hub transmission according to claim 27 wherein the clutch switching mechanism further comprises a biasing mechanism for biasing the control member toward one of the engaging position or the disengaging position.

30. The hub transmission according to claim 27 wherein the driver is partially disposed radially inwardly of the slave, and wherein the clutch mechanism comprises:
   a tooth disposed on an inner peripheral surface of the slave;
   a pawl disposed on an outer peripheral surface of the driver for swinging between an engaging position for engaging the tooth and a disengaging position for disengaging the tooth; and
   a pawl biasing mechanism for biasing the pawl toward the engaging position.

31. The hub transmission according to claim 30 wherein the tooth is shaped so that the clutch mechanism links the driver and the slave for integral rotation when the driver rotates in a first direction and so that the clutch mechanism allows relative rotation between the driver and the slave when the driver rotates in a second direction opposite the first direction.

32. The hub transmission according to claim 27 wherein the power transmitting mechanism comprises a planetary gear mechanism including:
   an inner-tooth gear disposed on the driver;
   a sun gear disposed on the hub axle;
   a planet gear carrier rotatably mounted around the hub axle and linkable to the slave; and
   a plurality of planet gears rotatably mounted to the planet gear carrier and meshing with the sun gear and the inner-tooth gear.

33. The hub transmission according to claim 32 wherein the inner-tooth gear is integrally formed on an inner peripheral surface of the driver, and wherein the sun gear is integrally formed on an outer peripheral surface of the hub axle.

34. The hub transmission according to claim 32 further comprising a one-way clutch mechanism disposed between the planet gear mechanism and the slave.

35. The hub transmission according to claim 34 wherein the one-way clutch mechanism is disposed between the planet gear carrier and the slave.

36. The hub transmission according to claim 27 wherein the driver comprises:
   a first driving member; and
   a second driving member axially aligned with the first driving member and nonrotatably coupled to the first driving member.

37. The hub transmission according to claim 36 wherein the slave is disposed around the second driving member.

38. The hub transmission according to claim 36 wherein the power transmission mechanism is disposed between the hub axle and the second driving member.

39. A bicycle hub transmission comprising:
   a hub axle;
   a driver rotatable mounted to the hub axle;
   a slave rotatably mounted to the hub axle;
   a power transmitting mechanism disposed between the driver and the slave for changing a rotational speed of the driver and for communicating rotational power from the driver to the slave;
   a clutch mechanism for selectively engaging and disengaging the slave and the driver; and
   a clutch switching mechanism including:
      an elongated weight member having a first end and a second end, wherein the second end pivots radially outwardly around the first end in response to centrifugal force created by rotation of the weight member around the hub axle, wherein the first end of the weight member is pivotably mounted for rotation with the driver;
      a control member operatively coupled to the clutch mechanism and rotatable about the hub axle between an engaging position for causing the clutch to engage the driver and the slave and a disengaging position for disengaging the driver and the slave; and
      an interlocking member coupled to the weight member in a position spaced apart from the first end of the weight member toward the second end of the weight member and coupled to the control member for rotating the control member in response to radially outward movement of the second end of the weight member; and
      wherein the weight member is disposed on an outer peripheral surface of the slave.

40. The hub transmission according to claim 24 wherein the control member is disposed within the slave.

41. A bicycle hub transmission comprising:
   a hub axle;
   a driver rotatably mounted to the hub axle;
   a slave rotatably mounted to the hub axle;
   a power transmitting mechanism disposed between the driver and the slave for changing a rotational speed of the driver and for communicating rotational power from the driver to the slave;
   a clutch mechanism for selectively engaging and disengaging the slave and the driver; and
   a clutch switching mechanism including:
      an elongated weight member having a first end and a second end, wherein the second end pivots radially outwardly around the first end in response to centrifugal force created by rotation of the weight member around the hub axle, wherein the first end of the weight member is pivotably mounted for rotation with the driver;
      a control member operatively coupled to the clutch mechanism and rotatable about the hub axle between an engaging position for causing the clutch to engage the driver and the slave and a disengaging position for disengaging the driver and the slave; and
      an interlocking member coupled to the weight member in a position spaced apart from the first end of the weight member toward the second end of the weight member and coupled to the control member for rotating the control member in response to radially outward movement of the second end of the weight member; and
      wherein the slave is partially disposed radially inwardly of the driver, and wherein the clutch mechanism comprises:
         a tooth disposed on an inner peripheral surface of the driver;
         a pawl disposed on an outer peripheral surface of the slave for swinging between an engaging position for engaging the tooth and a disengaging position for disengaging the tooth; and
         a pawl biasing mechanism for biasing the pawl toward the engaging position.

42. The hub transmission according to claim 41 wherein the tooth is shaped so that the clutch mechanism links the driver and the slave for integral rotation when the driver rotates in a first direction and so that the clutch mechanism allows relative rotation between the driver and the slave when the driver rotates in a second direction opposite the first direction.

* * * * *